(12) United States Patent
Chien et al.

(10) Patent No.: US 10,812,791 B2
(45) Date of Patent: Oct. 20, 2020

(54) OFFSET VECTOR IDENTIFICATION OF TEMPORAL MOTION VECTOR PREDICTOR

(71) Applicant: QUALCOMM Incorporated, San Diego, CA (US)

(72) Inventors: Wei-Jung Chien, San Diego, CA (US); Yi-Wen Chen, San Diego, CA (US); Li Zhang, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 263 days.

(21) Appl. No.: 15/701,711

(22) Filed: Sep. 12, 2017

(65) Prior Publication Data

US 2018/0084260 A1 Mar. 22, 2018

Related U.S. Application Data

(60) Provisional application No. 62/395,878, filed on Sep. 16, 2016.

(51) Int. Cl.
| | |
|---|---|
| *H04N 19/105* | (2014.01) |
| *H04N 19/70* | (2014.01) |
| *H04N 19/52* | (2014.01) |
| *H04N 19/139* | (2014.01) |
| *H04N 19/44* | (2014.01) |
| *H04N 19/513* | (2014.01) |

(52) U.S. Cl.
CPC ......... *H04N 19/105* (2014.11); *H04N 19/139* (2014.11); *H04N 19/44* (2014.11); *H04N 19/513* (2014.11); *H04N 19/52* (2014.11); *H04N 19/70* (2014.11); *H04N 19/521* (2014.11)

(58) Field of Classification Search
None
See application file for complete search history.

(56) References Cited

U.S. PATENT DOCUMENTS

| | | | |
|---|---|---|---|
| 8,488,677 B2 | 7/2013 | Jeon et al. | |
| 9,503,746 B2 * | 11/2016 | Xu | H04N 19/463 |

(Continued)

FOREIGN PATENT DOCUMENTS

| | | |
|---|---|---|
| GB | 2511288 A | 9/2014 |
| WO | 2014089475 A1 | 6/2014 |

OTHER PUBLICATIONS

International Preliminary Report on Patentability from corresponding PCT Application Serial No. PCT/US2017/051342 dated Aug. 21, 2018 (17 pp).

(Continued)

*Primary Examiner* — Tyler W. Sullivan
(74) *Attorney, Agent, or Firm* — Shumaker & Sieffert, P.A.

(57) ABSTRACT

In one example, a method includes receiving, in a coded video bitstream and for a current prediction unit (PU) of a current picture of video data, a representation of an offset vector that identifies a block of a reference picture, wherein the offset vector is within a set of values that are not uniformly distributed. The example method further includes determining, based on the block of the reference picture identified by the offset vector, motion information for the current PU. The example method further includes reconstructing the current PU based on the determined motion information.

19 Claims, 13 Drawing Sheets

(56) References Cited

U.S. PATENT DOCUMENTS

| | | | | |
|---|---|---|---|---|
| 2001/0003545 | A1* | 6/2001 | Hong | H04N 19/80 382/268 |
| 2003/0128762 | A1* | 7/2003 | Nakagawa | H04N 19/13 375/240.16 |
| 2009/0129703 | A1* | 5/2009 | Takeshima | H04N 19/51 382/299 |
| 2009/0207313 | A1* | 8/2009 | Bellers | H04N 19/56 348/699 |
| 2010/0014588 | A1* | 1/2010 | Nakazato | H04N 19/533 375/240.16 |
| 2011/0188583 | A1* | 8/2011 | Toraichi | G06T 5/002 375/240.27 |
| 2012/0236942 | A1 | 9/2012 | Lin et al. | |
| 2013/0028325 | A1* | 1/2013 | Le Floch | H04N 19/895 375/240.16 |
| 2013/0051463 | A1* | 2/2013 | Minoo | H04N 19/139 375/240.12 |
| 2013/0114725 | A1* | 5/2013 | Lou | H04N 19/52 375/240.16 |
| 2013/0235936 | A1* | 9/2013 | Campbell | H04N 19/52 375/240.16 |
| 2013/0242199 | A1* | 9/2013 | Hatano | H04N 5/225 348/659 |
| 2013/0271664 | A1* | 10/2013 | Mathew | H04N 5/21 348/607 |
| 2014/0133567 | A1* | 5/2014 | Rusanovskyy | H04N 19/597 375/240.16 |
| 2014/0140416 | A1* | 5/2014 | Yamazaki | H04N 19/463 375/240.25 |
| 2014/0218473 | A1* | 8/2014 | Hannuksela | H04N 19/597 348/43 |
| 2015/0078456 | A1* | 3/2015 | Hannuksela | H04N 19/42 375/240.25 |
| 2015/0086929 | A1 | 3/2015 | Hatakeyama et al. | |
| 2015/0269736 | A1* | 9/2015 | Hannuksela | H04N 13/122 345/419 |
| 2015/0365649 | A1 | 12/2015 | Chen et al. | |
| 2016/0057420 | A1 | 2/2016 | Pang et al. | |
| 2016/0100189 | A1* | 4/2016 | Pang | H04N 19/70 375/240.13 |
| 2016/0219278 | A1 | 7/2016 | Chen et al. | |
| 2016/0344903 | A1 | 11/2016 | Zhou | |
| 2017/0085892 | A1* | 3/2017 | Liu | H04N 19/132 |
| 2018/0040133 | A1* | 2/2018 | Srinivasan | H04N 19/56 |
| 2019/0246103 | A1* | 8/2019 | Jun | H04N 19/182 |

OTHER PUBLICATIONS

International Search Report and Written Opinion of International Application No. PC/US2017/051342, dated Nov. 22, 2017, 17 pp.

Karczewicz, et al., "Study of Coding Efficiency Improvements beyond HEVC," 113. MPEG Meeting; Oct. 19-23, 2015; Geneva; (Motion Picture Expert Group or ISO/IEC JTC1/SC29/WG11), No. M37102, Oct. 15, 2015, XP030065470, 13 pp.

Laroche et al., "RD Optimized Coding for Motion Vector Predictor Selection", IEEE Transaction on Circuits and Systems for Video Technology, IEEE Service Center, Piscataway, NJ, US, vol. 18 (9), Sep. 1, 2008, pp. 1247-1257, XP011231739, ISSN: 1051-8215, DOI: 10.1109/TCSVT.2008.92882, 11 pp.

Lou et al., "Motion Vector Scaling for Non-Uniform Interpolation Offset", 7th JCT-VC Meeting; 98th MPEG Meeting; Oct. 21-30, 2011; Geneva; Joint Collaborative Team on Video Coding of ISO/IEC JTC1/SC29/WG11 and ITU-T SG.16, No. JCTVC-G699, Nov. 9, 2011, XP030110683, 5 pp.

ITU-T H.261, Line Transmission of Non-Telephone Signals, Video Codec for Audiovisual Services at px64 kbits, The International Telecommunication Union, Mar. 1993, 29 pp.

ITU-T H.262, Series H: Audiovisual and Multimedia Systems, Infrastructure of audiovisual services—Coding of moving video, Information technology—Generic coding of moving pictures and associated audio information: Video, The International Telecommunication Union, Feb. 2000, 220 pp.

ITU-T H.263, Series H: Audiovisual and Multimedia Systems, Infrastructure of audiovisual services—Coding of moving video, Video coding for low bit rate communication, The International Telecommunication Union, Jan. 2005, 226 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Tech et al., "3D-HEVC Draft Text 7," Joint Collaborative Team on 3D Video Coding Extensions of ITU-T SG 16 WP 3 and ISO/IEC JTC 1/SC 29/WG 11, Feb. 12-18, 2015, Document: JCT3V-K1001-v7, 113 pp.

Sullivan G., Overview of the High Efficiency Video Coding (HEVC) Standard, IEEE Transactions on Circuits and Systems for Video Technology, vol. 22, No. 12, pp. 1649-1668, Dec. 2012.

Wiegand T., et al.,"Overview of the H.264/AVC Video Coding Standard," IEEE Transactions on Circuits and Systems for Video Technology, IEEE Service Center, Piscataway, NJ, US, vol. 13, No. 7, Jul. 1, 2003, pp. 560-576, 17 pp.

"International Standard ISO/IEC 23008-2, Information Technology-High efficiency coding and media delivery in heterogeneous environments—Part 2 High efficiency video coding," First Edition, Dec. 1, 2013, 312 pp.

ITU_T H.223, Series H: Audiovisual and Multimedia Systems, Infrastructure of audiovisual services—Transmission of multiplexing and synchronization, Multiplexing protocol for low bit rate multimedia communication, The International Telecommunication Union, Jul. 2001, 74 pp.

Zhang et al: "Test Model 6 of 3D-HEVC and MV-HEVC," JCT-3V Meeting; Oct. 25-Nov. 1, 2013; Geneva, CH, The Joint Collaborative Team on 3D Video Coding Extension Development of ISO/IEC JTC1/SC29/WG11 and ITU-T SG.16; No. JCT3V-F1005, Dec. 16, 2013, 52 pp.

Tech, et al., "MV-HEVC Draft Text 5", Jul. 27-Aug. 2, 2013; Joint Collaborative Team on 3D Video Coding Extension Development of ITU-T SG 16 WP 3 and ISO/IEC JTC 1/SC 29/WG 11, Doc: JCT3V-E1004-v6, 5th Meeting: Vienna, AT, Aug. 7, 2013, 65 pp.

Tech et al., "3D-HEVC Draft Text 1," Joint Collaborative Team on 3D Video Coding Extension Development of ITU-T SG 16 WP 3 and ISO/IEC JTC 1/SC 29/WG 11, Jul. 27-Aug. 2, 2013, Document: JCT3V-E1001-v3, Sep. 11, 2013, 89 pp.

Liu H., et al., "Multiple Hypotheses Bayesian Frame Rate Up-Conversion by Adaptive Fusion of Motion-Compensated Interpolations", IEEE transactions on circuits and systems for video technology, Aug. 2012, vol. 22, No. 8, pp. 1188-1198.

Lee, et al., "Frame Rate Up Conversion Based on Variational Image Fusion", IEEE Transactions on image processing, Jan. 2014, vol. 23, No. 1, pp. 399-412.

Kim et al., "New Frame Rate Up-Conversion Algorithms With Low Computational Complexity", IEEE Transactions on circuits and systems for video technology, Mar. 2014, vol. 24, No. 3, pp. 384-393.

Kamp, et al., "Decoder-Side Motion Vector Derivation for Block-Based Video Coding", IEEE transactions on circuits and systems for video technology, vol. 22, No. 12, Dec. 2012, pp. 1732-1745.

Chiu, et al., "Decoder-side Motion Estimation and Wiener filter for HEVC", 2013 Visual Communications and Image Processing (VCIP), IEEE, Nov. 17, 2013; XP032543658, DOI: 10.1109/VCIP.2013.6706446 [retrieved on Jan. 8, 2014], 6 pp.

Liu, et al., "A Block-Based Gradient Descent Search Algorithm for Block Motion Estimation in Video Coding", IEEE Transactions Circuits and Systems for Video Technology, Aug. 1996, vol. 6, No. 4, pp. 419-422; 4 pp.

(56) References Cited

OTHER PUBLICATIONS

Tham, et al., "A Novel Unrestricted Center-Biased Diamond Search Algorithm for Block Motion Estimation," IEEE Transactions on Circuits and Systems for Video Technology, Aug. 1998, vol. 8, No. 4, pp. 369-377.
Zhu, et al., "Hexagon-Based Search Pattern for Fast Block Motion Estimation", IEEE Transactions on Circuits and Systems Video Technology, May 2002, vol. 12, No. 5, pp. 349-355.
Reply to Written Opinion from corresponding Application Serial No. PCT/US2017/051342 filed on Jan. 9, 2018, (16 pages).

\* cited by examiner

OFFSET VECTOR IDENTIFICATION OF TEMPORAL MOTION VECTOR PREDICTOR

This application claims the benefit of U.S. Provisional Application No. 62/395,878, filed Sep. 16, 2016, the entire content of which is hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard (also referred to as ITU-T H.265), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which for some techniques may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In one example, a method includes receiving, in a coded video bitstream and for a current prediction unit (PU) of a current picture of video data, a representation of an offset vector that identifies a block of a reference picture, wherein the offset vector is within a set of values that are not uniformly distributed; determining, based on the block of the reference picture identified by the offset vector, motion information for the current PU; and reconstructing the current PU based on the determined motion information.

In another example, a device for decoding video data includes a memory configured to store video data; and one or more processors. In this example, the one or more processors are configured to: receive, in a coded video bitstream and for a current PU of a current picture of the video data, a representation of an offset vector that identifies a block of a reference picture, wherein the offset vector is within a set of values that are not uniformly distributed; determine, based on the block of the reference picture identified by the offset vector, motion information for the current PU; and reconstruct the current PU based on the determined motion information.

In another example, a device for decoding video data includes means for receiving, in a coded video bitstream and for a current PU of a current picture of video data, a representation of an offset vector that identifies a block of a reference picture, wherein the offset vector is within a set of values that are not uniformly distributed; means for determining, based on the block of the reference picture identified by the offset vector, motion information for the current PU; and means for reconstructing the current PU based on the determined motion information.

In another example, a computer-readable storage medium stores instructions that, when executed, cause one or more processors of a video decoder to: receive, in a coded video bitstream and for a current PU of a current picture of video data, a representation of an offset vector that identifies a block of a reference picture, wherein the offset vector is within a set of values that are not uniformly distributed; determine, based on the block of the reference picture identified by the offset vector, motion information for the current PU; and reconstruct the current PU based on the determined motion information.

In another example, a method of encoding video data includes selecting, for a current PU of a current picture of video data, a block of a reference picture identifiable by an offset vector that is within a set of values that are not uniformly distributed; and encoding, in a coded video bitstream, a representation of the offset vector and residual data that represents pixel differences between the current PU and a predictor block identified by motion information for the current PU, the motion information for the current PU determinable based on motion information of the block of the reference picture.

In another example, a device for encoding video data includes a memory configured to store video data; and one or more processors. In this example, the one or more processors are configured to: select, for a current PU of a current picture of video data, a block of a reference picture identifiable by an offset vector that is within a set of values that are not uniformly distributed; and encode, in a coded video bitstream, a representation of the offset vector and residual data that represents pixel differences between the current PU and a predictor block identified by motion information for the current PU, the motion information for the current PU determinable based on motion information of the block of the reference picture.

In another example, a device for encoding video data includes means for selecting, for a current PU of a current picture of video data, a block of a reference picture identifiable by an offset vector that is within a set of values that are not uniformly distributed; and means for encoding, in a coded video bitstream, a representation of the offset vector and residual data that represents pixel differences between the current PU and a predictor block identified by motion information for the current PU, the motion information for the current PU determinable based on motion information of the block of the reference picture.

In another example, a computer-readable storage medium stores instructions that, when executed, cause one or more processors of a video encoder to: select, for a current PU of a current picture of video data, a block of a reference picture identifiable by an offset vector that is within a set of values that are not uniformly distributed; and encode, in a coded video bitstream, a representation of the offset vector and residual data that represents pixel differences between the current PU and a predictor block identified by motion information for the current PU, the motion information for the current PU determinable based on motion information of the block of the reference picture.

BRIEF DESCRIPTION OF DRAWINGS

FIGS. 11A and 11B are conceptual diagrams illustrating examples of sub-PUs of a PU, as well as neighboring sub-PUs to the PU.

DETAILED DESCRIPTION

Figure 1:
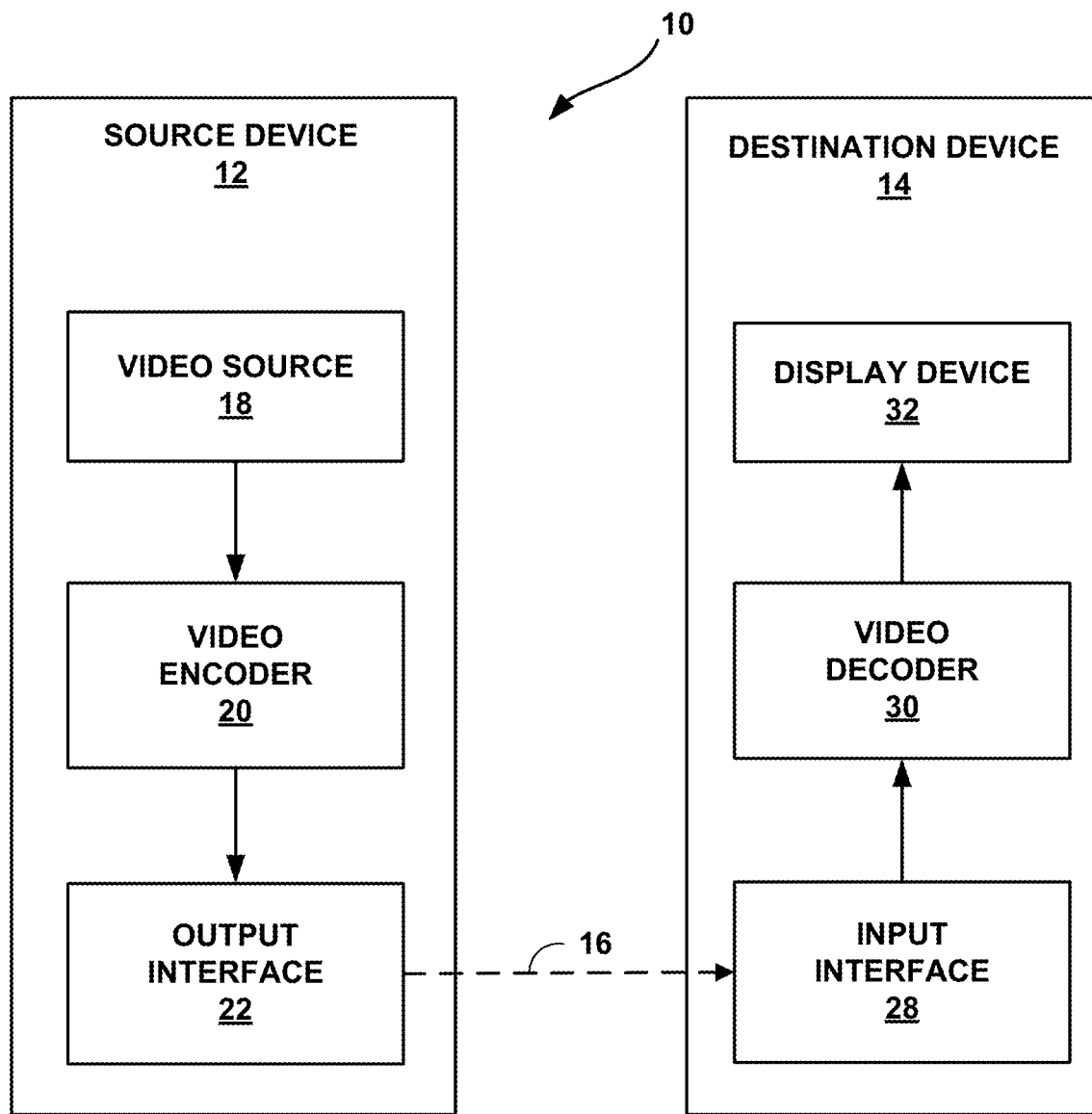
FIG. 1 is a block diagram illustrating an example video encoding and decoding system that may utilize techniques for implementing advanced temporal motion vector prediction (ATMVP).

In general, this disclosure is related to motion vector prediction in video codecs. More specifically, a video decoder may receive offset vector for a current block. The offset vector may identify a reference block from—which the video decoder may predict a motion vector of the current block. For instance, a video decoder may receive, for a current prediction unit (PU) in a current picture, an offset vector that identifies a reference block in a reference picture (e.g., that is different than the current picture). The video decoder may use motion information, including a motion vector, for the reference block to obtain a motion vector for the current PU that identifies a predictor block for the current PU. The video decoder may combine pixel values of the predictor block with residual information for the current PU to reconstruct pixel values of the current PU.

In some examples, the offset vector may cover all of the blocks in the reference picture. For instance, the offset vector may be able to identify any block in the reference picture as the reference block. However, the signalling overhead needed to enable offset vectors to be able to cover all blocks in reference frames may be significant relative to the coding efficiencies gained through the use of offset vectors. As such, a video coder may signal a value of an offset vector from a limited set of values. A limited set of values may be referred to as a range of values. For example, a video coder may signal values of components of an offset vector (e.g., a horizontal x component and a vertical y component) in the range of x,y∈{−3, −2, −1, 0, 1, 2, 3}. In the previous example, the offset vector would only be able to identify blocks in a limited area of the reference picture as a reference block (e.g., blocks that are within plus or minus three base units horizontal and vertical from the current block). While signaling values of offset vectors from a limited set of values may provide coding efficiency (e.g., less data needed to represent the offset vectors), the resulting reduction in area of the reference picture may be undesirable.

In accordance with one or more techniques of this disclosure, a video coder may signal a value of an offset vector from a limited set of values that is not uniformly distributed. For example, a video coder may signal values of components of an offset vector (e.g., a horizontal x component and a vertical y component) in the range of x,y∈{−8, −4, −2, 0, 2, 4, 8}. By using a range of values that is not uniformly distributed, video coders may signal offset vectors that are able to identify blocks in larger areas of reference pictures than when using uniformly distributed values. As the offset vectors are able to identify blocks in larger areas of reference pictures, it is more likely that a video encoder will be able to generate an offset vector that identifies a reference block having motion information that a video decoder can use to obtain motion information for a current block that identifies a predictor block with pixel values similar to those of the current block. By enabling a video decoder to be able to identify a predictor block with pixel values similar to those of the current block, the amount of data used to represent residual data for the current block may be reduced. In this way, the techniques of this disclosure may improve coding efficiency.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010.

In addition, there is a newly developed video coding standard, namely High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). A recent draft of HEVC is available from phenix.int-evry.fr/. The HEVC standard is also presented jointly in Recommendation ITU-T H.265 and International Standard ISO/IEC 23008-2, both entitled "High efficiency video coding," and both published October, 2014.

Motion information: For each block, a set of motion information can be available. A set of motion information contains motion information for forward and backward prediction directions. Here forward and backward prediction directions are two prediction directions corresponding to reference picture list 0 (RefPicList0) and reference picture list 1 (RefPicList1) of a current picture or slice. The terms "forward" and "backward" do not necessarily have a geometry meaning. Instead, they are used to distinguish which reference picture list a motion vector is based on. Forward prediction means the prediction formed based on reference list 0, while backward prediction means the prediction formed based on reference list 1. In case both reference list 0 and reference list 1 are used to form a prediction for a given block, it is called bi-directional prediction.

For a given picture or slice, if only one reference picture list is used, every block inside the picture or slice is forward predicted. If both reference picture lists are used for a given picture or slice, a block inside the picture or slice may be forward predicted, or backward predicted, or bi-directionally predicted.

For each prediction direction, the motion information contains a reference index and a motion vector. A reference index is used to identify a reference picture in the corresponding reference picture list (e.g., RefPicList0 or RefPicList1). A motion vector has both a horizontal and a vertical component, with each indicating an offset value along horizontal and vertical direction respectively. In some descriptions, for simplicity, the term "motion vector" may be used interchangeably with motion information, to indicate both the motion vector and its associated reference index.

Picture order count (POC) is widely used in video coding standards to identify a display order of a picture. Although there are cases in which two pictures within one coded video sequence may have the same POC value, it typically does not happen within a coded video sequence. When multiple coded video sequences are present in a bitstream, pictures with a same value of POC may be closer to each other in terms of decoding order. POC values of pictures are typically used for reference picture list construction, derivation of reference picture set as in HEVC and motion vector scaling.

Macroblock (MB) structure in Advanced Video Coding (AVC) (H.264): In H.264/AVC, each inter macroblock (MB) may be partitioned into four different ways:
  One 16×16 MB partition
  Two 16×8 MB partitions
  Two 8×16 MB partitions
  Four 8×8 MB partitions Different MB partitions in one MB may have different reference index values for each direction (RefPicList0 or RefPicList1). When an MB is not partitioned into four 8×8 MB partitions, it has only one motion vector for each MB partition in each direction.

When an MB is partitioned into four 8×8 MB partitions, each 8×8 MB partition can be further partitioned into sub-blocks, each of which can have a different motion vector in each direction. There are four different ways to get sub-blocks from an 8×8 MB partition:
  One 8×8 sub-block
  Two 8×4 sub-blocks
  Two 4×8 sub-blocks
  Four 4×4 sub-blocks Each sub-block can have a different motion vector in each direction. Therefore, a motion vector is present in a level equal to or higher than the sub-block.

Temporal direct mode in AVC: In AVC, temporal direct mode could be enabled in either MB or MB partition level for skip or direct mode in B slices. For each MB partition, the motion vectors of the block co-located with the current MB partition in the RefPicList1[0] of the current block are used to derive the motion vectors. Each motion vector in the co-located block is scaled based on POC distances.

Spatial direct mode in AVC: In AVC, a direct mode can also predict motion information from the spatial neighbors.

Coding Unit (CU) Structure in High Efficiency Video Coding (HEVC): In HEVC, the largest coding unit in a slice is called a coding tree block (CTB) or coding tree unit (CTU). A CTB contains a quad-tree, the nodes of which are coding units.

The size of a CTB can range from 16×16 to 64×64 in the HEVC main profile (although technically 8×8 CTB sizes can be supported). A coding unit (CU) could be the same size of a CTB and as small as 8×8. Each coding unit is coded with one mode. When a CU is inter coded, it may be further partitioned into 2 or 4 prediction units (PUs) or become just one PU when further partition doesn't apply. When two PUs are present in one CU, they can be half size rectangles or two rectangle size with ¼ or ¾ size of the CU.

When the CU is inter coded, one set of motion information is present for each PU. In addition, each PU is coded with a unique inter-prediction mode to derive the set of motion information.

Motion prediction in HEVC: In the HEVC standard, there are two motion vector prediction modes, named merge (skip is considered as a special case of merge) and advanced motion vector prediction (AMVP) modes, respectively, for a prediction unit (PU).

In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information while an AMVP candidate contains just one motion vector for a specific prediction direction and reference index. The candidates for both modes are derived similarly from the same spatial and temporal neighboring blocks.

FIG. 1 is a block diagram illustrating an example video encoding and decoding system 10 that may utilize techniques for signaling an offset vector that identifies a source of motion information for a current block. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for advanced temporal motion vector prediction (ATMVP). In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques of this disclosure may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard, extensions to the HEVC standard, or subsequent standards, such as ITU-T H.266. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In general, the HEVC standard describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU in H.265 has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HEVC Test Model (HM) supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

U.S. application Ser. No. 15/005,564 (hereinafter, "the '564 Application"), filed Jan. 25, 2016, described the following techniques, which may be performed by video encoder 20 and/or video decoder 30, alone or in any combination, in addition to the techniques of this disclosure. The '564 Application describes advanced temporal motion vector prediction (ATMVP), which is a technique for generating an additional candidate motion vector that is derived from spatial and temporal neighboring blocks of a current PU (as opposed to a temporal motion vector prediction (TMVP) candidate which is derived from a co-located PU of a co-located picture). In particular, the '564 Application describes techniques related to the position of the ATMVP candidate, if inserted, e.g., as a merge candidate list. Assume the spatial candidates and TMVP candidate are inserted into a merge candidate list in a certain order. The ATMVP candidate may be inserted in any relatively fixed position of those candidates. In one alternative, for example, the ATMVP candidate can be inserted in the merge candidate list after the first two spatial candidates e.g., A1 and B1. In one alternative, for example, the ATMVP candidate can be inserted after the first three spatial candidates e.g., A1 and B1 and B0. In one alternative, for example, the ATMVP candidate can be inserted after the first four candidates e.g., A1, B1, B0, and A0. In one alternative, for example, the ATMVP candidate can be inserted right before the TMVP candidate. In one alternatively, for example, the ATMVP candidate can be inserted right after the TMVP candidate. Alternatively, the position of ATMVP candidate in the candidate list can be signaled in the bitstream. The positions of other candidates, including the TMVP candidate can be additionally signaled.

The '564 Application also describes techniques related to an availability check of the ATMVP candidate can apply by accessing just one set of motion information, which video encoder 20 and/or video decoder 30 may be configured to perform. When such a set of information is unavailable, e.g., one block being intra-coded, the whole ATMVP candidate is considered as unavailable. In that case, the ATMVP will not be inserted into the merge list. A center position, or a center sub-PU is used purely to check the availability of the ATMVP candidate. When a center sub-PU is used, the center sub-PU is chosen to be the one that covers the center position (e.g., the center 3 position, with a relative coordinate of (W/2, H/2) to the top-left sample of the PU, wherein W×H is the size of the PU). Such a position or center sub-PU may be used together with the temporal vector to identify a corresponding block in the motion source picture. A set of motion information from the block that covers the center position of a corresponding block is identified.

The '564 Application also describes techniques for deriving a representative set of motion information for the ATMVP coded PU from a sub-PU, which video encoder 20 and/or video decoder 30 may be configured to perform. To form the ATMVP candidate the representative set of motion information is first formed. Such a representative set of motion information may be derived from a fixed position or fixed sub-PU. It can be chosen in the same way as that of the set of motion information used to determine the availability of the ATMVP candidate, as described above. When a sub-PU has identified its own set of motion information and it is being unavailable, it is set to be equal to the representative set of motion information. If the representative set of motion information is set to be that of a sub-PU, no additional motion storage is needed at the decoder side for the current CTU or slice in the worst case scenario. Such a representative set of motion information is used in all scenarios when the decoding processes requires the whole PU to be represented by one set of motion information, including pruning, such that the process is used to generate combined bi-predictive merging candidates.

The '564 Application also describes techniques related to how the ATMVP candidate may be pruned with TMVP candidate and interactions between TMVP and ATMVP can be considered, which may be performed by video encoder 20 and/or video decoder 30. The pruning of a sub-PU based candidate, e.g., ATMVP candidate with a normal candidate, may be conducted by using the representative set of motion information (as in bullet #3 of the '564 Application) for such a sub-PU based candidate. If such set of motion information is the same as a normal merge candidate, the two candidates are considered as the same. Alternatively, or in addition, a check is performed to determine whether the ATMVP contains multiple different sets of motion information for multiple sub-PUs; if at least two different sets are identified, the sub-PU based candidate is not used for pruning, i.e., is considered to be different to any other candidate; Otherwise, it may be used for pruning (e.g., may be pruned during the pruning process). Alternatively, or in addition, the ATMVP candidate may be pruned with the spatial candidates, e.g., the left and top ones only, with positions denoted as A1 and B1. Alternatively, only one candidate is formed from temporal reference, being either ATMVP candidate or TMVP candidate. When ATMVP is available, the candidate is ATMVP; otherwise, the candidate is TMVP. Such a candidate is inserted into the merge candidate list in a position similar to the position of TMVP. In this case, the maximum number of candidates may be kept as unchanged. Alternatively, TMVP is always disabled even when ATMVP is unavailable. Alternatively, TMVP is used only when ATMVP is unavailable. Alternatively, when ATMVP is available and TMVP is unavailable, one set of motion information of one sub-PU is used as the TMVP candidate. In this case, furthermore, the pruning process between ATMVP and TMVP is not applied. Alternatively, or additionally, the temporal vector used for ATMVP may be also used for TMVP, such that the bottom-right position or center 3 position as used for current TMVP in HEVC do not need to be used. Alternatively, the position identified by the temporal vector and the bottom-right and center 3 positions are jointly considered to provide an available TMVP candidate.

Figure 9:
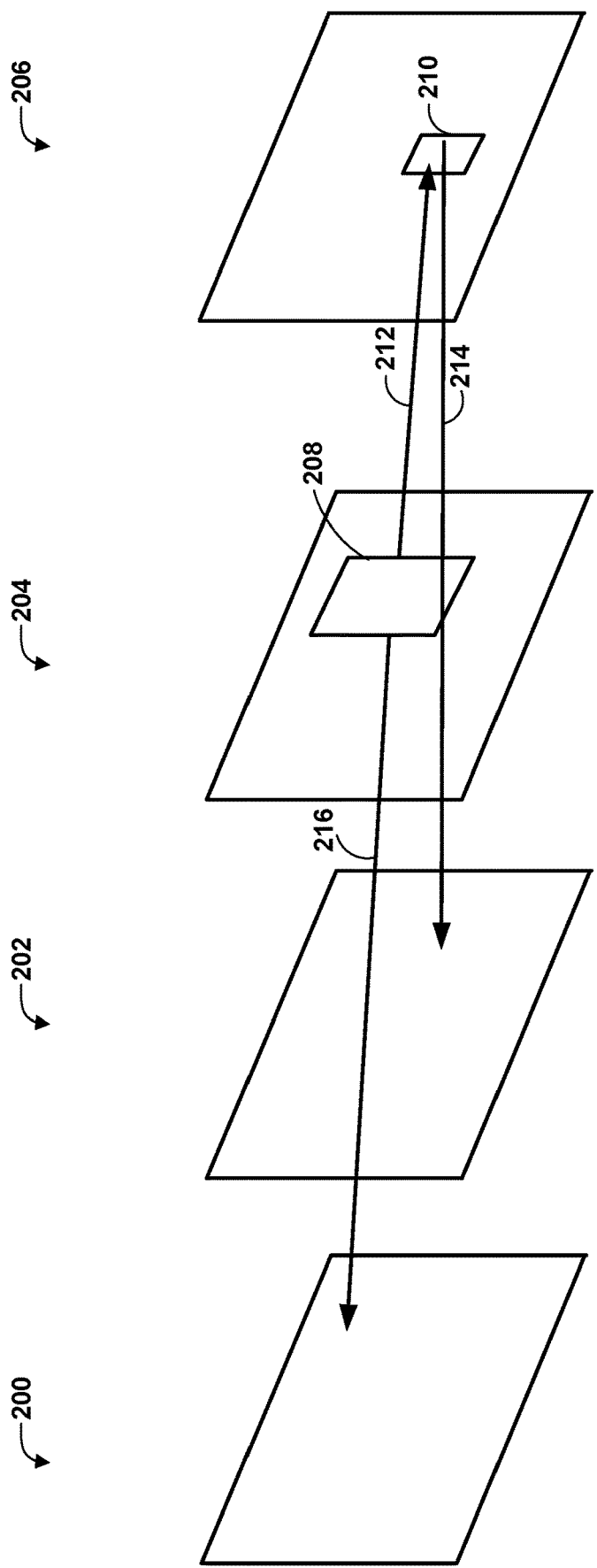
FIG. 9 is a conceptual diagram illustrating relevant pictures in ATMVP (similar to TMVP).

The '564 Application also describes how multiple availability checks for ATMVP can be supported to give higher chances for the ATMVP candidate to be more accurate and efficient, which may be performed by video encoder 20 and/or video decoder 30. When the current ATMVP candidate from the motion source picture as identified by the first temporal vector (e.g., as shown in FIG. 9) is unavailable, other pictures can be considered as motion source picture. When another picture is considered, it may be associated with a different second temporal vector, or may be associated simply with a second temporal vector scaled from the first temporal vector that points to the unavailable ATMVP candidate. A second temporal vector can identify an ATMVP candidate in a second motion source picture and the same availability check can apply. If the ATMVP candidate as derived from the second motion source picture is available, the ATMVP candidate is derived and no other pictures need to be checked; otherwise, other pictures as motion source pictures need to be checked. Pictures to be checked may be those in the reference picture lists of the current picture, with a given order. For each list, the pictures are checked in the ascending order of the reference index. List X is first checked and pictures in list Y (being 1−X) follows. List X is chosen so that list X is the list that contains the collocated picture used for TMVP. Alternatively, X is simply set to be 1 or 0. Pictures to be checked may include those identified by motion vectors of the spatial neighbors, with a given order. A partition of the PU that the current ATMVP apply to may be 2N×2N, N×N, 2N×N, N×2N or other AMP partitions, such as 2N×N/2. Alternatively, or in addition, if other partition sizes can be allowed, ATMVP can be supported too, and such a size may include e.g., 64×8. Alternatively, the mode may be only applied to certain partitions, e.g., 2N×2N.

The '564 Application also describes how the ATMVP candidate may be marked using a different type of merge mode, which video encoder 20 and/or video decoder 30 may be configured to perform.

When identifying a vector (temporal vector as in the first stage) from neighbors, multiple neighboring positions, e.g., those used in merge candidate list construction, can be checked in order. For each of the neighbors, the motion vectors corresponding to reference picture list 0 (list 0) or reference picture list 1 (list 1) can be checked in order. When two motion vectors are available, the motion vectors in list X can be checked first and followed by list Y (with Y being equal to 1−X), so that list X is the list that contains the collocated picture used for TMVP. In ATMVP, a temporal vector is used be added as a shift of any center position of a sub-PU, wherein the components of temporal vector may need to be shifted to integer numbers. Such a shifted center position is used to identify a smallest unit that motion vectors can be allocated to, e.g., with a size of 4×4 that covers the current center position. Alternatively, motion vectors corresponding to list 0 may be checked before those corresponding to list 1. Alternatively, motion vectors corresponding to list 1 may be checked before those corresponding to list 0. Alternatively, all motion vectors corresponding to list X in all spatial neighbors are checked in order, followed by the motion vectors corresponding to list Y (with Y being equal to 1−X). Here X can be the one that indicates where collocated picture belongs to or just simply set to be 0 or 1. The order of the spatial neighbors can be the same as that used in HEVC merge mode.

The '564 Application also describes techniques relating to, when in the first stage of identifying a temporal vector does not include identifying a reference picture, the motion source picture as shown in FIG. 9, may be simply set to be a fixed picture, e.g., the collocated picture used for TMVP, which may be performed by video encoder 20 and/or video decoder 30. In such a case, the vector may only be identified from the motion vectors that point to such a fixed picture. In such a case, the vector may only be identified from the motion vectors that point to any picture but further scaled towards the fixed picture. When in the first stage of identifying a vector consists identifying a reference picture, the motion source picture as shown in FIG. 9, one or more of the following additional checks may apply for a candidate motion vector. If the motion vector is associated with a picture or slice that is Intra coded, such a motion vector is considered as unavailable and cannot be used to be converted to the vector. If the motion vector identifies an Intra block (by e.g., adding the current center coordinate with the motion vector) in the associated a picture, such a motion vector is considered as unavailable and cannot be used to be converted to the vector.

The '564 Application also describes techniques relating to, when in the first stage of identifying a vector, the components of the vector may be set to be (half width of the current PU, half height of the current PU), so that it identifies a bottom-right pixel position in the motion source picture, which may be performed by video encoder 20 and/or video decoder 30. Here (x, y) indicates horizontal and vertical components of one motion vector. Alternatively, the components of the vector may be set to be (sum(half width of the current PU, M), sum(half height of the current PU, N)) where the function sum(a, b) returns the sum of a and b. In one example, when the motion information is stored in 4×4 unit, M and N are both set to be equal to 2. In another example, when the motion information is stored in 8×8 unit, M and N are both set to be equal to 4.

The '564 Application also describes techniques related to the sub-block/sub-PU size when ATMVP applies being signaled in a parameter set, e.g., sequence parameter set of picture parameter set, which may be performed by video encoder 20 and/or video decoder 30. The size ranges from the least PU size to the CTU size. The size can be also pre-defined or signaled. The size can be e.g., as small as 4×4. Alternatively, the sub-block/sub-PU size can be derived based on the size of PU or CU. For example, the sub-block/sub-PU can be set equal to max (4×4, (width of CU)>>M). The value of M can be pre-defined or signaled in the bitstream.

The '564 Application also describes techniques relating to the maximum number of merge candidates being increased by 1 due to the fact that ATMVP can be considered as a new merge candidate, which may be performed by video encoder 20 and/or video decoder 30. For example, compared to HEVC which takes up to 5 candidates in a merge candidate list after pruning, the maximum number of merge candidates can be increased to 6. Alternatively, pruning with conventional TMVP candidate or unification with the conventional TMVP candidate can be performed for ATMVP such that the maximum number of merge candidates can be kept as unchanged. Alternatively, when ATMVP is identified to be available, a spatial neighboring candidate is excluded from the merge candidate list, e.g. the last spatial neighboring candidate in fetching order is excluded.

The '564 Application also describes techniques relating to, when multiple spatial neighboring motion vectors are considered to derive the temporal vector, a motion vector similarity may be calculated based on the neighboring motion vectors of the current PU as well as the neighboring motion vectors identified by a specific temporal vector being set equal to a motion vector, which may be performed by video encoder 20 and/or video decoder 30. The one that leads to the highest motion similarity may be chosen as the final temporal vector. In one alternative, for each motion vector from a neighboring position N, it identifies a block (same size as the current PU) in the motion source picture, wherein its neighboring position N contains a set of the motion information. This set of motion vector is compared with the set of motion information as in the neighboring position N of the current block. In another alternative, for each motion vector from a neighboring position N, it identifies a block in the motion source picture, wherein its neighboring positions contain multiple sets of motion information. These multiple sets of motion vector are compared with the multiple sets of motion information from the neighboring positions of the current PU in the same relative positions.

A motion information similarity may be calculated according to the techniques above. For example, the current PU has the following sets of motion information from A1, B1, A0 and B0, denoted as MIA1, MIB1, MIA0 and MIB0. For a temporal vector TV, it identifies a block corresponding to the PU in the motion source picture. Such a block has motion information from the same relative A1, B1, A0 and B0 positions, and denoted as TMIA1, TMIB1, TMIA0 and TMIB0. The motion similarity as determined by TV is calculated as $MStv = \Sigma_{N \in \{A1, B1, A0, B0\}} MVSim(MI_N, TMI_N)$, wherein MVSim( ) defines the similarity between two sets (MIN, TMIN) of motion information. In both of the above cases, the motion similarity MVSim can be used, wherein the two input parameters are the two motion information, each containing up to two motion vectors and two reference indices. Since each pair of the motion vectors in list X are actually associated with reference pictures in different list X of different pictures, the current picture and the motion source picture.

For each of the two motion vectors MVXN and TMVXN (with X being equal to 0 or 1), the motion vector difference MVDXN can be calculated as MVXN−TMVXN, according to the techniques above. Afterwards, the difference MVSimX is calculated as e.g., $abs(MVDX_N[0]) + abs(MVDX_N[1])$, or $(MVDX_N[0]*MVDX_N[0] + MVDX_N[1]*MVDX_N[1])$. If both sets of motion information contain available motion vectors, MVSim is set equal to MVSim0+ MVSim1. In order to have a unified calculation of the motion difference, both of the motion vectors need to be scaled towards the same fixed picture, which can be, e.g., the first reference picture RefPicListX[0] of the list X of the current picture. If the availability of the motion vector in list X from the first set and the availability of the motion vector in list X from the second set are different, i.e., one reference index is −1 while the other is not, such two sets of motion information are considered as not similar in direction X.

If the two sets are not similar in both sets, the final MVSim function may return a big value T, which may be, e.g., considered as infinite, according to the techniques above. Alternatively, for a pair of sets of motion information, if one is predicted from list X (X being equal to 0 or 1) but not list Y (Y being equal to 1−X) and the other has the same status, a weighting between 1 and 2 (e.g., MVSim is equal to MVSimX*1.5) may be used. When one set is only predicted from list X and the other is only predicted from list Y, MVSim is set to the big value T. Alternatively, for any set of motion information, as long as one motion vector is available, both motion vectors will be produced. In the case that only one motion vector is available (corresponding to list X), it is scaled to form the motion vector corresponding to the other list Y. Alternatively, the motion vector may be measured based on differences between the neighboring pixels of the current PU and the neighboring pixels of the block (same size as the current PU) identified by the motion vector. The motion vector that leads to the smallest difference may be chosen as the final temporal vector.

The '564 Application also describes techniques relating to, when deriving the temporal vector of the current block, motion vectors and/or temporal vectors from neighboring blocks that are coded with ATMVP may have a higher priority than motion vectors from other neighboring blocks, which may be performed by video encoder 20 and/or video decoder 30. In one example, only temporal vectors of neighboring blocks are checked first, and the first available one can be set to the temporal vector of the current block. Only when such temporal vectors are not present, normal motion vectors are further checked. In this case, temporal vectors for ATMVP coded blocks need to be stored. In another example, only motion vectors from ATMVP coded neighboring blocks are checked first, and the first available one can be set to the temporal vector of the current block. Only when such temporal vectors are not present, normal motion vectors are further checked. In another example, only motion vectors from ATMVP coded neighboring blocks are checked first, and the first available one can be set to the temporal vector of the current block. If such motion vectors are not available, the checking of temporal vector continues similar to the manner discussed above. In another example, temporal vectors from neighboring blocks are checked first, the first available one can be set to the temporal vector of the current block. If such motion vectors are not available, the checking of temporal vector continues similar to the manner discussed above. In another example, temporal vectors and motion vectors of ATMVP coded neighboring blocks are checked first, the first available one can be set to the temporal vector of the current block. Only when such temporal vectors and motion vectors are not present, normal motion vectors are further checked.

The '564 Application also describes techniques relating to, when multiple spatial neighboring motion vectors are considered to derive the temporal vector, a motion vector may be chosen so that it minimizes the distortion that are calculated from pixel domain, e.g., template matching may be used to derive the temporal vector such that the one leads to minimal matching cost is selected as the final temporal vector. These techniques may also be performed by video encoder 20 and/or video decoder 30.

The '564 Application also describes techniques for derivation of a set of motion information from a corresponding block (in the motion source picture) being performed in a way that when a motion vector is available in the corresponding block for any list X (denote the motion vector to be MVX), for the current sub-PU of the ATMVP candidate, the motion vector is considered as available for list X (by scaling the MVX), which may be performed by video encoder 20 and/or video decoder 30. If the motion vector is unavailable in the corresponding block for any list X, the motion vector is considered as unavailable for list X. Alternatively, when motion vector in the corresponding block is unavailable for list X but available for list 1−X (denoted 1−X by Y and denote the motion vector to be MVY), the motion vector is still considered as available for list X (by scaling the MVY towards the target reference picture in list X). Alternatively, or in addition, when both motion vectors in the corresponding block for list X and list Y (equal to 1−X) are available, the motion vectors from list X and list Y are not necessary to be used to be directly scaled to generate the two motion vectors of a current sub-PU by scaling. In one example, when formulating the ATMVP candidate, the low-delay check as done in TMVP applies to each sub-PU. If for every picture (denoted by refPic) in every reference picture list of the current slice, picture order count (POC) value of refPic is smaller than POC of current slice, current slice is considered with low-delay mode. In this low-delay mode, motion vectors from list X and list Y are scaled to generate the motion vectors of a current sub-PU for list X and list Y respectively. When not in the low-delay mode, only one motion vector MVZ from MVX or MVY is chosen and scaled to generate the two motion vectors for a current sub-PU. Similar to TMVP, in such a case Z is set equal to collocated_from_l0_flag, meaning that it depends on whether the collocated picture as in TMVP is in the list X or list Y of the current picture. Alternatively, Z is set as follows: if the motion source picture is identified from list X, Z is set to X. Alternatively, in addition, when the motion source pictures belong to both reference picture lists, and RefPicList0[idx0] is the motion source picture that is first present in list 0 and RefPicList(1)[idx1] is the motion source picture that is first present in list 1, Z is set to be 0 if idx0 is smaller than or equal to idx1, and set to be 1 otherwise.

The '564 Application also describes techniques for signaling the motion source picture, which may be performed by video encoder 20 and/or video decoder 30. In detail, a flag indicating whether the motion source picture is from list 0 or list 1 is signaled for a B slice. Alternatively, in addition, a reference index to a list 0 or list 1 of the current picture may be signaled to identify the motion source picture.

The '564 Application also describes techniques related to, when identifying a temporal vector, a vector being considered as unavailable (thus other ones can be considered) if it points to an Intra coded block in the associated motion source picture, which may be performed by video encoder 20 and/or video decoder 30.

Figure 10:
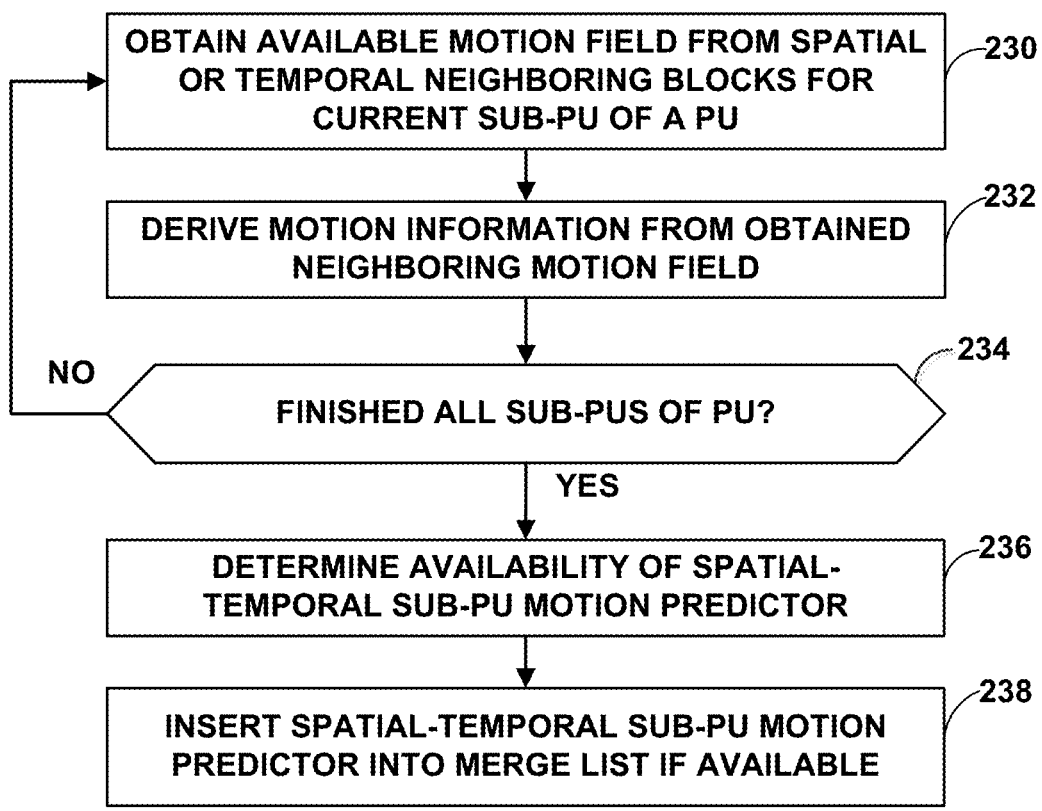
FIG. 10 is a flowchart illustrating an example method for deriving motion vectors for a given block from spatial and temporal neighboring blocks of the given block

Video encoder 20 and/or video decoder 30 may be configured to derive motion vectors for a sub-block (e.g., a sub-PU) of a block (e.g., a PU) from spatial and temporal neighboring blocks. As discussed below, a video coder (such as video encoder 20 or video decoder 30) may derive a motion vector for each sub-PU of a PU from information of neighboring blocks in a three-dimensional domain. This means the neighboring blocks could be the spatial neighbors in the current picture or the temporal neighbors in previous coded pictures. FIG. 10, discussed in greater detail below, is a flowchart illustrating an example spatial-temporal motion vector predictor (STMVP) derivation process. In addition, the methods described above with respect to bullets #1, #2, #3, #4, #6, #7, #12, and #13 of the '564 Application could be directly extended to STMVP.

In the following description, the term "block" is used to refer the block-unit for storage of prediction related info, e.g. inter or intra prediction, intra prediction mode, motion information, etc. Such prediction info is saved and may be used for coding future blocks, e.g. predicting the prediction mode information for future blocks. In AVC and HEVC, the size of such a block is 4×4.

It is noted that in the following description, 'PU' indicates the inter-coded block unit and sub-PU to indicate the unit that derives the motion information from neighboring blocks.

Video encoder 20 and/or video decoder 30 may be configured to apply any of the following methods, alone or in any combination.

Figures 11A, 11B:
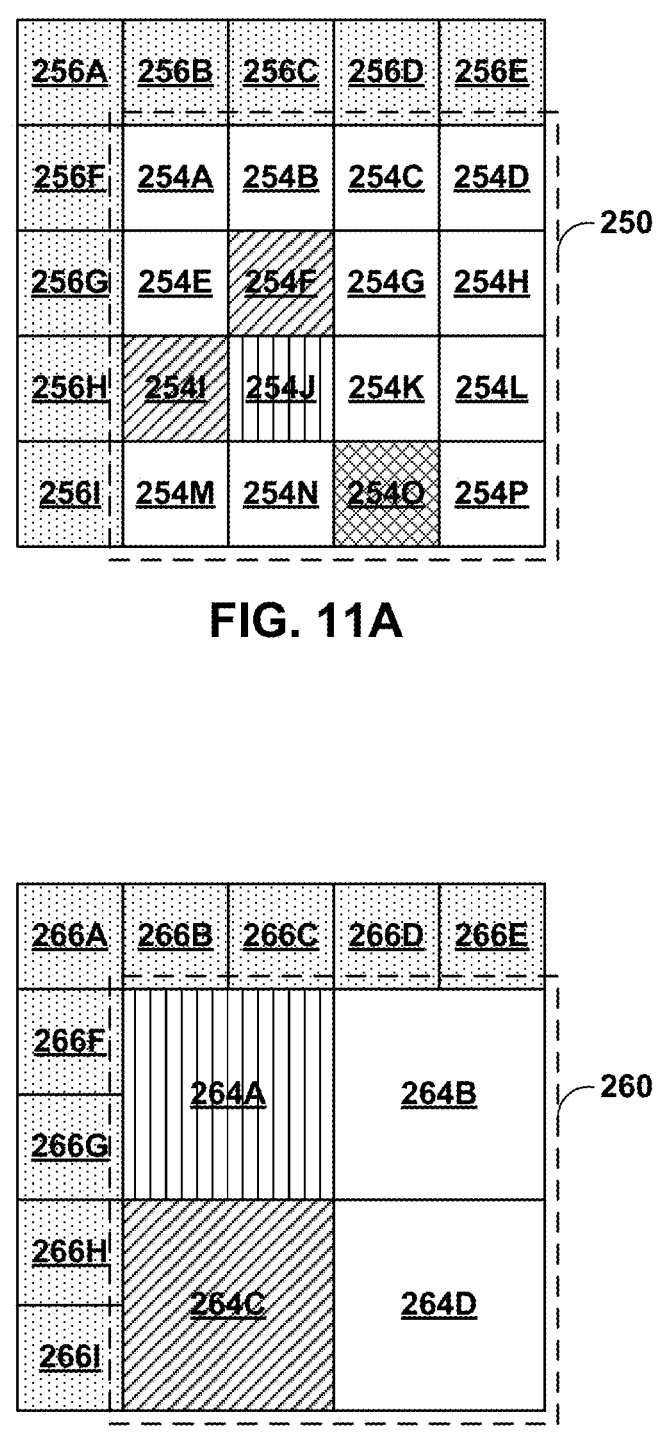

Sizes of sub-PUs and neighboring blocks: Considering a PU with multiple sub-PUs, the size of a sub-PU is usually equal to or bigger than that neighboring block size. In one example, as shown in FIG. 11A, shaded squares represent neighboring blocks (represented using lower-case letters, a, b, . . . i) that are outside of the current PU and the remaining squares (represented using upper-case letters, A, B, . . . , P) represent the sub-PUs in the current PU. The sizes of a sub-PU and its neighboring blocks are the same. For example, the size is equal to 4×4. FIG. 11B shows another example where sub-PUs are larger than the neighboring blocks. In this manner, sizes of neighboring blocks used for motion information derivation may be equal to or smaller than sizes of the sub-blocks for which motion information is derived. Alternatively, sub-PUs may take non-squared shapes, such as rectangle or triangle shapes. Furthermore, the size of the sub-PU may be signaled in the slice header. In some examples, the process discussed above regarding signaling sub-block or sub-PU sizes, e.g., in a parameter set, may be extended to these techniques. For example, the sub-PU size may be signaled in a parameter set, such as a sequence parameter set (SPS) or a picture parameter set (PPS).

With respect to the example of FIG. 11A, assume that the video coder applies a raster scan order (A, B, C, D, E, etc.) to the sub-PUs to derive motion prediction for the sub-blocks. However, other scan orders may be applied also and it should be noted that these techniques are not limited to raster scan order only.

Neighboring blocks may be classified into two different types: spatial and temporal. A spatial neighboring block is an already coded block or an already scanned sub-PU that is in the current picture or slice and neighboring to the current sub-PU. A temporal neighboring block is a block in the previous coded picture and neighboring to the co-located block of the current sub-PU. In one example, the video coder uses all the reference pictures associated with a current PU to obtain the temporal neighboring block. In another example, the video coder uses a sub-set of reference pictures for STMVP derivation, e.g., only the first entry of each reference picture list.

Following these definitions, for sub-PU (A), with further reference to FIG. 11A, all blocks (256A, B, . . . , I) and their collocated blocks in previously coded pictures are spatial and temporal neighboring blocks that are treated as available. According to raster scan order, blocks 254B, C, D, E . . . P are not spatially available for sub-PU (A). Though, all sub-PUs (from 256A to P) are temporally available neighboring blocks for sub-PU (A), because their motion information can be found in their collocated blocks in previous coded pictures. Take sub-PU (G) as another example: its spatial neighboring blocks that are available include those from 256A, B . . . to I, and also from 254A to F. Furthermore, in some examples, certain restriction may be applied to the spatial neighbouring blocks, e.g., the spatial neighbouring blocks (i.e., from 256A, B . . . to I) may be restricted to be in the same LCU/slice/tile.

The video coder (video encoder 20 or video decoder 30) may select a subset of all available neighboring blocks to derive motion information or a motion field for each sub-PU. The subset used for derivation of each PU may be pre-defined; alternatively, video encoder 20 may signal (and video decoder 30 may receive signaled data indicating) the subset as high level syntax in a slice header, PPS, SPS, or the like. To optimize the coding performance, the subset may be different for each sub-PU. In practice, a fixed pattern of location for the subset is preferred for simplicity. For example, each sub-PU may use its immediate above spatial neighbor, its immediate left spatial neighbor and its immediate bottom-right temporal neighbor as the subset. With respect to the example of FIG. 11A, when considering sub-PU (J) (horizontally hashed), the block above (F) and the block left (I) (diagonally down-left hashed) are spatially available neighboring blocks, and the bottom-right block (O) (diagonally hashed in both directions) is a temporally available neighboring block. With such a subset, sub-PUs in the current PU are to be processed sequentially (in the defined order, such as raster scan order) due to processing dependency.

Additionally or alternatively, when considering sub-PU (J), video encoder 20 and video decoder 30 may treat the block above (F) and the block left (I) as spatially available neighboring blocks, and the bottom block (N) and the right block (K) as temporally available neighboring blocks. With such a subset, video encoder 20 and video decoder 30 may process sub-PUs in the current PU sequentially due to processing dependency.

To allow paralleling processing of each sub-PU in the current PU, video encoder 20 and video decoder 30 may use a different subset of neighboring blocks for some sub-PUs for motion prediction derivation. In one example, a subset may be defined that only contains spatial neighbor blocks that do not belong to the current PU, e.g. blocks a, b, . . . i. In this case, parallel processing would be possible.

In another example, for a given sub-PU, if the sub-PUs spatial neighboring block is within the current PU, the collocated block of that spatial neighboring block may be put in the subset and used to derive the motion information of the current sub-PU. For example, when considering sub-PU (J), the temporal collocated blocks of the above block (F) and the left block (I) and bottom-right block (O) are selected as the subset to derive the motion of the sub-PU (J). In this case, the subset for sub-PU (J) contains three temporal neighboring blocks. In another example, a partially-paralleling process may be enabled wherein one PU is split into several regions and each region (covering several sub-PUs) could be processed independently.

Sometimes the neighboring blocks are intra-coded, wherein it is desirable to have a rule to determine replacement motion information for those blocks for better motion prediction and coding efficiency. For example, considering sub-PU (A), there might be cases where blocks b, c, and/or f are intra-coded, and a, d, e, g, h, and i are inter-coded. For spatial neighbors, video encoder 20 and video decoder 30 may use a pre-defined order to populate the motion information of intra-coded blocks with that of the first found inter coded block. For example, the searching order of the above neighbors can be set as starting from the immediate above neighbor rightward until the rightmost neighbor, meaning the order of b, c, d, and e. The search order of the left neighbors can be set as starting from the immediate left neighbor downward until the bottommost neighbor, meaning the order of f, g, h, and i. If no inter-coded block is found through the search process, then above or left spatial neighbor is considered unavailable. For temporal neighbors, the same rule as specified in the TMVP derivation can be used. However, it should be noted that other rules can also be used, e.g. rules based on motion direction, temporal distance (search in different reference pictures) and spatial locations, etc.

Video encoder 20 and video decoder 30 may use the following method for deriving motion information for a given sub-PU in accordance with the techniques of this disclosure. Video encoder 20 and video decoder 30 may first determine a target reference picture, and perform motion vector scaling. For each neighboring block, motion vector scaling may be applied to its motion vector based on each reference picture list in order to map all the neighboring blocks' motion vectors to the same reference picture in each list. There are two steps: first, determine a source motion vector to be used for scaling. Second, determine a target reference picture where the source motion vector is projected to. For the first step, several methods can be used:
  a) for each reference list, motion vector scaling is independent from a motion vector in another reference list; for a given block's motion information, if there is no motion vector in a reference list (e.g. uni-prediction mode instead of bi-prediction mode), no motion vector scaling is performed for that list.
  b) motion vector scaling is not independent from motion vector in another reference list; for a given block's motion information, if no motion vector is unavailable in a reference list, it can be scaled from the one in another reference list.
  c) both motion vectors are scaled from one pre-defined reference list (as in TMVP)

In one example, in accordance with the techniques of this disclosure, video encoder 20 and video decoder 30 use method a) above for scaling motion vectors of spatial neighboring blocks, and method c) above for scaling motion vectors of temporal neighboring blocks. However, other combinations may be used in other examples.

As for the second step, the target reference picture can be selected according to a certain rule based on the motion information (e.g. reference pictures) of available spatial neighboring blocks. One example of such a rule is the majority rule, i.e., selecting the reference picture shared by majority of the blocks. In this case, there is no signaling needed for the target reference picture from the encoder to decoder because the same information can also be inferred at decoder side using the same rule. Alternatively, such reference picture may also be specified explicitly in slice header, or signalled in some other methods to decoder. In one example, the target reference picture are determined as the first reference picture (refidx=0) of each reference list.

After determining the target reference picture and scaling the motion vectors as necessary, video encoder 20 and video decoder 30 derive motion information for a given sub-PU. Assume there are N available neighboring blocks with motion information for a given sub-PU. First, video encoder 20 and video decoder 30 determine the prediction direction (InterDir). One simple method for determining the prediction direction is as follows:
  a. InterDir is initialized as zero, then looping through the motion information of N available neighboring blocks;
  b. InterDir=(InterDir bitwiseOR 1), if there is at least one motion vector in List 0;
  c. InterDir=(InterDir bitwiseOR 2), if there is at least one motion vector in List 1.

Here "bitwiseOR" represent the bitwise OR operation. The value of InterDir is defined as: 0 (no inter prediction), 1 (inter prediction based on List 0), 2 (inter prediction based on List 1), and 3 (inter prediction based on both List 0 and List 1), in this example.

Alternatively, similar to the determination on target reference picture for motion vector scaling described above, the majority rule may be used to determine the value of InterDir for the given sub-PU based on all available neighboring blocks' motion information.

After InterDir is determined, motion vectors can be derived. For each reference list based on the derived InterDir, there may be M motion vectors (M<=N) available through motion vector scaling to a target reference picture as discussed above. The motion vector for the reference list can be derived as:

$$(MV_x, MV_y) = \left(\left(\sum_{i=0}^{M} w_i * MV_{xi} + O_i\right) \bigg/ \sum_{i=0}^{M} w_i, \left(\sum_{j=0}^{M} w_j * MV_{yj} + O_j\right) \bigg/ \sum_{j=0}^{M} w_j\right)$$ Equation (1)

where $w_i$ and $w_j$ are the weighting factors for the horizontal and the vertical motion component respectively, and $O_i$ and $O_j$ are the offset values that are dependent on the weighting factors.

The weighting factors may be determined based on various factors. In one example, the same rule may be applied to all sub-PUs within one PU. The rule may be defined as follows:

For example, the weighting factor can be determined based on the location distance of the current sub-PU and a corresponding neighboring block.

In another example, the weighting factor can also be determined based on the POC distance between the target reference picture and the reference picture associated with a corresponding neighboring block's motion vector before scaling.

In yet another example, the weighting factor may be determined based on motion vector difference or consistency.

For simplicity, all the weighting factors may also be set to 1.

Alternatively, different rules may be applied to sub-PUs within one PU. For example, the above rule may be applied, in addition, for sub-PUs located at the first row/first column, the weighting factors for motion vectors derived from temporal neighboring blocks are set to 0 while for the remaining blocks, the weighting factors for motion vectors derived from spatial neighboring blocks are set to 0.

It should be noted that in practice, the equations above and below may be implemented as is, or simplified for easy implementation. For example, to avoid division or floating point operation, fixed point operation may be used to approximate the equation above. One instance is that to avoid dividing by 3, one may instead choose to multiply with 43/128 to replace division operation with multiplication and bit-shift. Those variations in implementation should be considered covered under the same spirit of the techniques of this disclosure.

Additionally or alternatively, when the process invokes two motion vectors, equation (1) may be substituted with equation (2) below:

$$(MV_x, MV_y) = ((\Sigma_{i=0}^{1} MV_{xi})/2, (\Sigma_{i=0}^{1} MV_{yi})/2) \quad \text{Equation (2)}$$

Additionally or alternatively, when the process invokes three motion vectors, equation (1) may be substituted with equation (3) below:

$$(MV_x, MV_y) = ((\Sigma_{i=0}^{2} MV_{xi} + \text{sign}(\Sigma_{i=0}^{2} MV_{xi})*1)*43/128, (\Sigma_{i=0}^{2} MV_{yi} + \text{sign}(-\Sigma_{i=0}^{2} MV_{yi})*1)*43/128)) \quad \text{Equation (3)}$$

Additionally or alternatively, when the process invokes four motion vectors, equation (1) may be substituted with equation (4) below:

$$(MV_x, MV_y) = \left(\left(\sum_{i=0}^{3} MV_{xi} + \text{sign}\left(\sum_{i=0}^{3} MV_{xi}\right)*2\right)/4, \left(\sum_{i=0}^{3} MV_{yi} + \text{sign}\left(\sum_{i=0}^{3} MV_{yi}\right)*2\right)/4\right) \quad \text{Equation (4)}$$

where sign(t) is 1 if t is a positive value and −1 if t is a negative value.

Additionally or alternatively, a non-linear operation may be also applied to derive the motion vectors, such as median filter.

Video encoder 20 and video decoder 30 may further determine motion vector availability for these techniques. Even when the motion vector predictors of each sub-PU are available, the STMVP mode may be reset to be unavailable for one PU. For example, once a motion vector predictor of each sub-PU is derived for a given PU, some availability checks are performed to determine if STMVP mode should be made available for the given PU. Such an operation is used to eliminate the cases where it is very unlikely for STMVP mode to be finally chosen for a given PU. When STMVP mode is not available, mode signaling does not include STMVP. In case that STMVP mode is implemented by inserting SMTVP in merge list, the merge list doesn't include this STMVP candidate when STMVP mode is determined to be not available. As a result, signaling overhead may be reduced.

Consider one PU partitioned into M sub-PUs. In one example, if N1 (N1<=M) sub-PUs among the M sub-PUs have the same motion vector predictor (i.e., same motion vectors and same reference picture indices), STMVP is only made available when N1 is smaller than a threshold or the predictor is different from other motion vector predictors (with smaller merge index) in the merge list. In another example, if N2 (N2<=M) sub-PUs under STMVP mode share the same motion vector predictors as corresponding sub-PUs under ATMVP, STMVP is only made available when N2 is smaller than another threshold. In one example, both thresholds for N1 and N2 are set equal to M.

Video encoder 20 and video decoder 30 may then insert the derived motion predictors into a candidate list, e.g., a merge list. If the STMVP candidate is available, video encoder 20 and video decoder 30 may insert the STMVP candidate into the candidate list (e.g., merge list). The process in bullet #1 of the '564 Application can be extended and the STMVP candidate can be inserted either before or after the ATMVP candidate. In one example, video encoder 20 and video decoder 30 insert the STMVP immediately after the ATMVP candidate in the merge list.

In some examples, the current design of merge/AMVP mode may present one or more disadvantages. As one example, in ATMVP, video encoder 20 and/or video decoder 30 derive the vector in the first stage from spatial and temporal neighboring blocks of the current PU. Using the derived vector in the first stage could bring additional coding gain compared to using a fixed starting point, such as a zero vector. However, the vector which is derived from neighbors may be sub-optimal for obtaining motion vector predictors for current block. As another example, for AMVP mode, video encoder 20 and/or video decoder 30 signal the reference indices as well as motion vector differences, while for the merge mode, video encoder 20 and/or video decoder 30 do not signal the motion information (including reference index and motion vector). Instead, in the merge mode, video encoder 20 and/or video decoder 30 inherit the motion information from either inherited from spatial or temporal neighboring block after potential scaling. As such, coding gains may be achieved through the use of an additional mode which could improve the motion vector predictor accuracy while keeping less side information to be signalled.

In accordance with one or more techniques of this disclosure, video encoder 20 and/or video decoder 30 may explicitly signal a vector, and derive the actual motion information used for motion compensation based on the signalled vector. The vector may be referred to as an offset vector or a block offset. In some examples, the vector could be used to identify a block from where the actual motion information could be obtained. In some examples, the vector could be used as the motion vector of one block for motion compensation, and the reference picture index could be pre-defined without signaling.

In one example, the new coding mode is used as a replacement of the implicitly derived vector in step 1 of ATMVP mode. That is, instead of deriving the vector from spatial and temporal neighboring blocks of the current block (e.g., PU), the vector (block offset) of step 1 may be explicitly signalled. The block offset indicates where the co-located block is and ATMVP process (temporal motion vector derivation) is being invoked. Alternatively, the derivation of the motion vector from the specified block is not limited to ATMVP, other derivations, such as STMVP, conventional TMVP, are also applicable with this invention.

In some examples, video encoder 20 and/or video decoder 30 may signal more than one offset for a PU. As another example, video encoder 20 and/or video decoder 30 may signal two block offsets to separately indicate from—where L0 and L1 motion is derived. As another example, video encoder 20 and/or video decoder 30 may signal more than one offset even for one prediction list (L0 or L1).

Signaling of co-located picture. In addition to the vector (i.e., the offset vector), video encoder 20 and/or video decoder 30 may signal an identification of the co-located picture from which the temporal motion vector predictor is derived at the block level. In some examples, video encoder 20 and/or video decoder 30 may derive the identification of the co-located picture from which the temporal motion vector predictor is derived from existing merge candidates or motion information of neighboring blocks, such as motion information of neighboring blocks which are not used in merge candidate derivation process.

Signaling of block offset: Video encoder 20 and/or video decoder 30 may use predictive coding to minimize the signaling cost of the offset vector. For instance, video encoder 20 may signal an offset vector difference, which may be added to an offset vector predictor to obtain the offset vector (i.e., block offset=block offset predictor+block offset difference). In some examples, unlike regular motion vectors, which use a fractional pixel as base unit in the grid, the offset vector might use minimum motion vector storage unit in the co-located picture as the base unit in the grid. As one example, if each 4×4 block in the co-located picture may store different motion vectors from its neighboring block, the base unit of the block offset is 4 pixels. As another example, if the motion vectors in the co-located picture are stored in N×M block, the base unit of the block offset may be N pixels in y-axis (vertical) and M pixels in x-axis (horizontal).

Region of support. In some examples, the offset vector might cover all the blocks in the co-located picture. In some examples, based on the location of the current block and the frame boundary, x- and y-components of the offset vector may both be bounded. The codeword range might be adjusted block by block. For example, x might be ranged from −128 to 256 and y might be ranged from −64 to 32 for one block. For the block on its right, x might be ranged from −120 to 262 and y might be ranged from −64 to 32.

In some examples, the range of the block offset may be limited to a part of the frame. The range might be predefined or signaled via high level syntax (SPS, PPS, slice header, etc.). In order to signal the offset efficiently, the codeword might be defined based on the offset range. For example, a truncated unary or truncated Golomb code is used to signal x- and y-component separately and the truncation point is based on offset range. In another example, x- and y-component might be signaled together. A predefined binarization might be used to define the codeword of each valid block offset.

In some examples, the distance between two allowed block offsets in a range might be larger than one base unit. For example, one block may set the range as
$x,y \in \{-3, -2, -1, 0, 1, 2, 3\}$
in which the distance between two allowed block offsets is one base unit, and another may set the range as
$x,y \in \{-6, -4, -2, 0, 2, 4, 6\}$
in which the distance between two allowed block offsets is two base units.

As discussed above, the base unit may be greater than a single pixel. For instance, the base unit may be the smallest block size in the reference picture for which a motion vector may be stored. As such, where the range of block offsets is
$x,y \in \{-3, -2, -1, 0, 1, 2, 3\}$
and the base unit is 4×4, the block offset may identify (i.e., point to) a block in the reference picture that is up to three blocks (i.e., 12 pixels) above or below the current block and three blocks (i.e., 12 pixels) to the left or right of the current block.

In some examples, the offset point in offset range might be not uniformly distributed. For example, one block may set the range as
$x,y \in \{-8, -4, -2, 0, 2, 4, 8\}$
in which the distance between offsets increases.

In some examples, the distance between two allowed block offset might be larger than one base unit and the offset point in offset range might be not uniformly distributed. The range selection may be based on POC difference between the current picture and the co-located picture, offset predictor, amplitude of offset, or specified in high level syntax.

For example, one block may set the range as
$x,y \in \{-3, -2, -1, 0, 1, 2, 3\}$
if POC difference between the current picture and the co-located picture is one. This represents a rectangle region of support and any block offset is allowed to be signaled within the rectangle region. Another block may set the range as
$x,y \in \{-6, -4, -2, 0, 2, 4, 6\}$
when the POC difference is four. This represents another rectangle region of support and only one of every four block offsets is allowed to be signaled within the rectangle region. Another block may set the range as
$x,y \in \{-8, -4, -2, 0, 2, 4, 8\}$.
This represents another rectangle region of support and allowed block offsets are less dense when it has longer distance from the predictor. In one particular example, the range may be
$x,y \in \{-8, -4, -2, -1, 0, 1, 2, 4, 8\}$
when the POC difference is less than two, and
$x,y \in \{-16, -8, -4, -2, 0, 2, 4, 8, 16\}$
when the POC difference is greater than one and less than four, and
$x,y \in \{-32, -16, -8, -4, 0, 4, 8, 16, 32\}$
when the POC difference is greater than three.

In some examples, sign of x- or y-components of the block offset may not be signaled. Instead, the sign(s) may be derived (e.g., determined) from the amplitude of the x- and y-components. For example, the sign of y-component may be equal to whether the sum of the amplitude of x-component and the amplitude of y-component is odd or not (e.g., the sign of the y-component may be positive when the amplitude of x-component and the amplitude of y-component is even and negative when the amplitude of x-component and the amplitude of y-component is odd, or vice versa). Some other factors might be also considered to determine the sign of the block offset, such as location of the current block, the size of the current block, and/or the width/height of the current block.

In some examples, more than one offset in the range may result in the same temporal motion vector predictors, or some offsets in the range may point to an intra block. As a result, some redundant offsets might be pruned (i.e., from the range) before signalling.

Offset predictor. One or more block offset predictor might be derived from the spatial or temporal neighbors of the current block, based on a certain checking order of neighbors. When multiple block offset predictors are derived, a final block offset predictor may be calculated with a function of these derived predictors. As one example, the function could be defined as the average or the dominant block offset predictor. As another example, the first available offset predictor may be directly used as the offset predictor of current block based on a certain checking order of neighbors. As another example, one index may be signaled to indicate which offset vector is used as the offset predictor for current block. As another example, the checking order may be defined to be the same as that used for merge candidate derivation. As another example, when one of the neighbor is using the proposed mode (e.g., ATMVP), the block offset of the block might be used as a block offset predictor for the current block. As another example, when one of the neighboring blocks has motion vectors with respect to the co-located picture (i.e., the reference picture), the motion vectors might be scaled or modified according to the range set of current block and the size of the based unit for motion storage and then be used as a block offset predictor for the current block. As another example, when one of the neighboring blocks has motion vectors but pointing to reference pictures other than co-located picture, the motion vectors might be scaled or modified according to POC information, the range set of current block and the size of the based unit for motion storage and then be used as a block offset predictor for the current block.

Combinations of the above mentioned examples can be applied with specific priority on the order which example is applied before others. In one example, neighbor using ATMVP mode has highest priority, neighbor having motion vectors with respect to co-located picture has second highest priority, and the neighbor having motion vectors pointing to reference pictures other than co-located picture has lowest priority. If there is no inter-predicted neighboring block, zero block offset is used as predictor. In one example, the block offset predictor is defined as the one utilized in current ATMVP mode, i.e., the one derived from spatial and temporal neighboring blocks.

Signalling of motion vector difference (MVD). In some examples, the motion vector difference (MVD) is not signaled and is set as zero by default (e.g., to save bits). In some examples, the motion vector difference can be signaled based on the proposed method (e.g., to give better motion compensated prediction).

As one example, the MVDs are signaled for List0, List 1 or both List0 and List1 for each W×H block. The size W×H can be different from the N×M as described above. As another example, the motion vectors fetched from the co-located picture are group together according to their similarity by check their List0, List1 or both List0 and List1 motions information. The MVDs are then signaled for List0, List 1 or both List0 and List1 motion for each group. As another example, the MVDs are derived by minimizing the difference of the predicted pixels between L0 and L1 motion for List0 for each W×H block within a search range.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
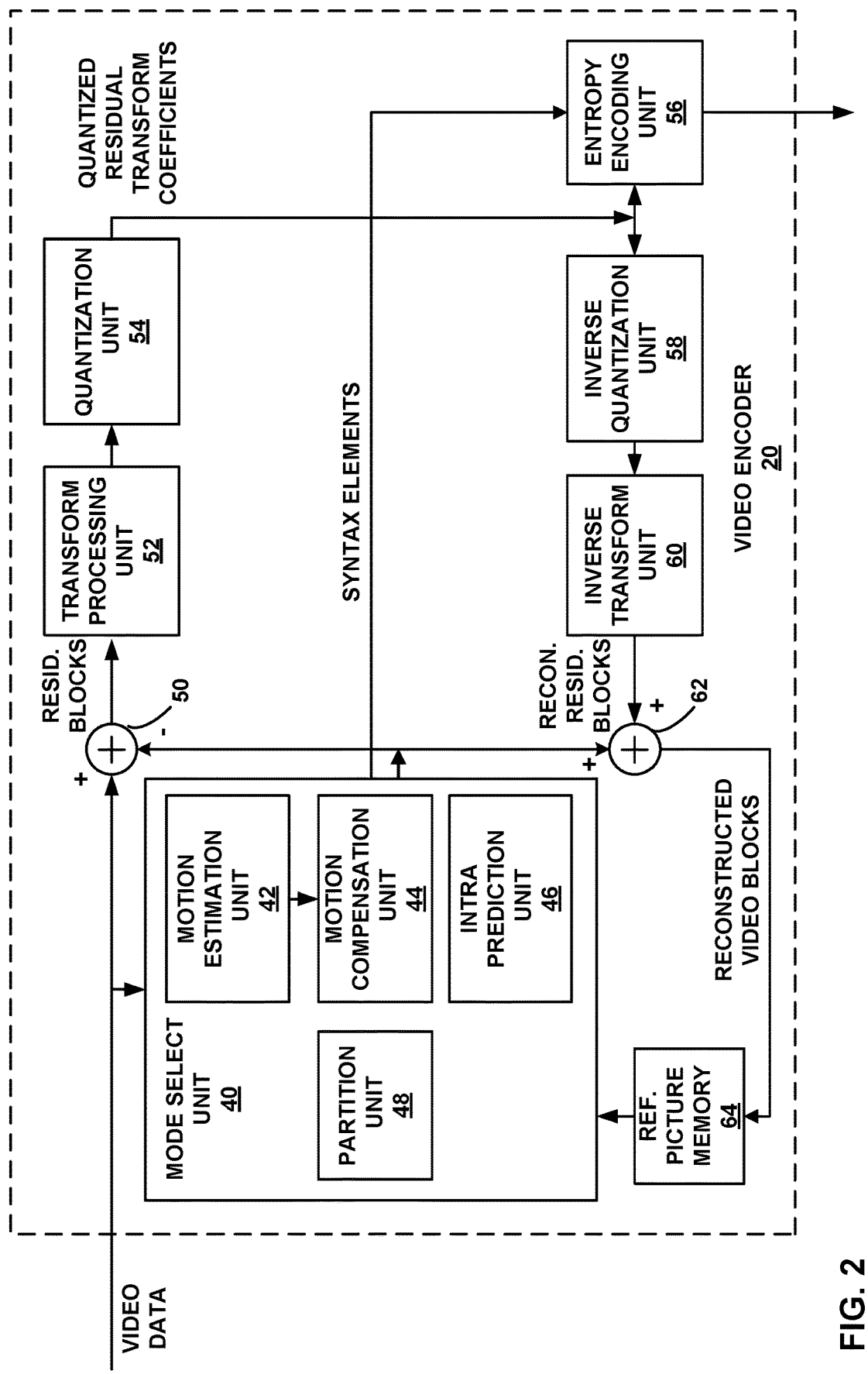
FIG. 2 is a block diagram illustrating an example of video encoder that may implement techniques for advanced temporal motion vector prediction (ATMVP).

FIG. 2 is a block diagram illustrating an example of video encoder 20 that may implement techniques for advanced temporal motion vector prediction (ATMVP). Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Mode select unit 40 may also select a sub-block (e.g., sub-PU) motion derivation mode for a block (e.g., a PU). That is, mode select unit 40 may compare a variety of encoding factors, including prediction modes, among a range of encoding passes to determine which encoding pass (and thus, which set of factors, including which prediction mode) yields desirable rate-distortion optimization (RDO) characteristics. When mode select unit 40 selects the sub-block motion information derivation mode for a block of video data (e.g., a PU), motion compensation unit 44 may use the techniques of this disclosure to predict the block.

In particular, using the sub-block motion information derivation mode, motion compensation unit 44 may derive motion information for sub-blocks of the block. For example, motion compensation unit 44 may, for each sub-block, determine motion information for two or more neighboring sub-blocks and derive motion information for the sub-block from the motion information for the neighboring sub-blocks. The neighboring sub-blocks may include, for example, spatial and/or temporal neighboring sub-blocks. In one example, motion compensation unit 44 derives motion information for each sub-block by averaging the motion information (e.g., motion vectors) for a left-neighboring spatial sub-block, an above-neighboring spatial sub-block, and a bottom-right temporal neighboring sub-block, as discussed below in greater detail with respect to FIG. 11A. In other examples, motion compensation unit 44 may derive the motion information for each sub-block using, e.g., one of equations (1)-(4) above. Motion compensation unit 44 may use the derived motion information for each of the sub-blocks to determine prediction data for the sub-blocks. By retrieving this prediction data for each of the sub-blocks, motion compensation unit 44 produces a predicted block for the current block using the sub-block motion information derivation mode.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Moreover, entropy encoding unit 56 may encode various other syntax elements for the various blocks of video data. For example, entropy encoding unit 56 may encode syntax elements representative of a prediction mode for each PU of each CU of the video data. When inter-prediction is indicated for a PU, entropy encoding unit 56 may encode motion information, which may include whether a motion vector is encoded using merge mode or advanced motion vector prediction (AMVP). In either case, video encoder 20 forms a candidate list including candidates (spatial and/or temporal neighboring blocks to the PU) from which the motion information may be predicted. In accordance with the techniques of this disclosure, the candidate list may include a candidate that indicates that a sub-block motion information derivation mode is to be used for the PU. Furthermore, entropy encoding unit 56 may encode a candidate index into the candidate list that indicates which of the candidates is to be used. Thus, if the sub-block motion information derivation mode is selected, entropy encoding unit 56 encodes a candidate index referring to the candidate that represents the sub-block motion information derivation mode.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

In this manner, video encoder 20 represents an example of a video encoder configured to determine that a motion prediction candidate for a current block of video data indicates that motion information is to be derived for sub-blocks of the current block, and in response to the determination: partition the current block into the sub-blocks, for each of the sub-blocks, derive motion information using motion information for at least two neighboring blocks, and decode the sub-blocks using the respective derived motion information. That is, video encoder 20 both encodes and decodes blocks of video data using the techniques of this disclosure.

Figure 3:
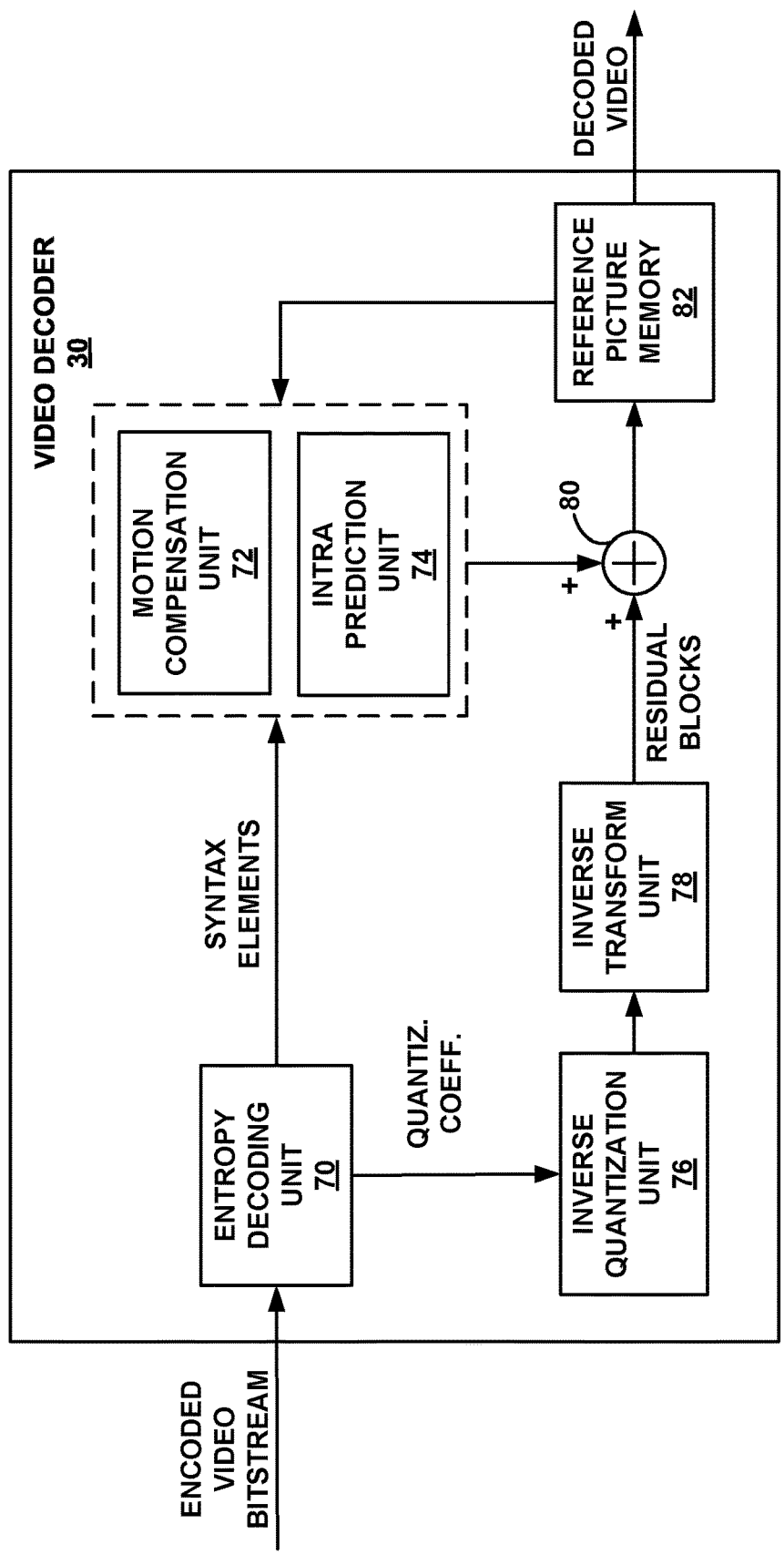
FIG. 3 is a block diagram illustrating an example of video decoder that may implement techniques for advanced temporal motion vector prediction (ATMVP).

FIG. 3 is a block diagram illustrating an example of video decoder 30 that may implement techniques for advanced temporal motion vector prediction (ATMVP). In the example of FIG. 3, video decoder 30 includes an entropy decoding unit 70, motion compensation unit 72, intra-prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

In accordance with the techniques of this disclosure, entropy decoding unit 70 decodes a value for a candidate index that refers to a candidate list, and passes the value of the candidate index to motion compensation unit 72, when a block, such as a PU, is predicted using inter-prediction. The value of the candidate index may refer to a candidate in the candidate list that represents that the block is predicted using a sub-block motion information derivation mode. If the value of the candidate index does refer to candidate in the candidate list that represents that the block is predicted using a sub-block motion information derivation mode, motion compensation unit 72 may generate a predicted block for the block using the sub-block motion information derivation mode.

More particularly, using the sub-block motion information derivation mode, motion compensation unit 72 may derive motion information for sub-blocks of the block. For example, motion compensation unit 72 may, for each sub-block, determine motion information for two or more neighboring sub-blocks and derive motion information for the sub-block from the motion information for the neighboring sub-blocks. The neighboring sub-blocks may include, for example, spatial and/or temporal neighboring sub-blocks. In one example, motion compensation unit 72 derives motion information for each sub-block by averaging the motion information (e.g., motion vectors) for a left-neighboring spatial sub-block, an above-neighboring spatial sub-block, and a bottom-right temporal neighboring sub-block, as discussed below in greater detail with respect to FIG. 11A. In other examples, motion compensation unit 72 may derive the motion information for each sub-block using, e.g., one of equations (1)-(4) above. Motion compensation unit 72 may use the derived motion information for each of the sub-blocks to determine prediction data for the sub-blocks. By retrieving this prediction data for each of the sub-blocks, motion compensation unit 72 produces a predicted block for the current block using the sub-block motion information derivation mode.

Inverse quantization unit 76 inverse quantizes, i.e., de-quantizes, the quantized transform coefficients provided in the bitstream and decoded by entropy decoding unit 70. The inverse quantization process may include use of a quantization parameter QPY calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 represents an example of a video decoder configured to determine that a motion prediction candidate for a current block of video data indicates that motion information is to be derived for sub-blocks of the current block, and in response to the determination: partition the current block into the sub-blocks, for each of the sub-blocks, derive motion information using motion information for at least two neighboring blocks, and decode the sub-blocks using the respective derived motion information.

Figure 4:
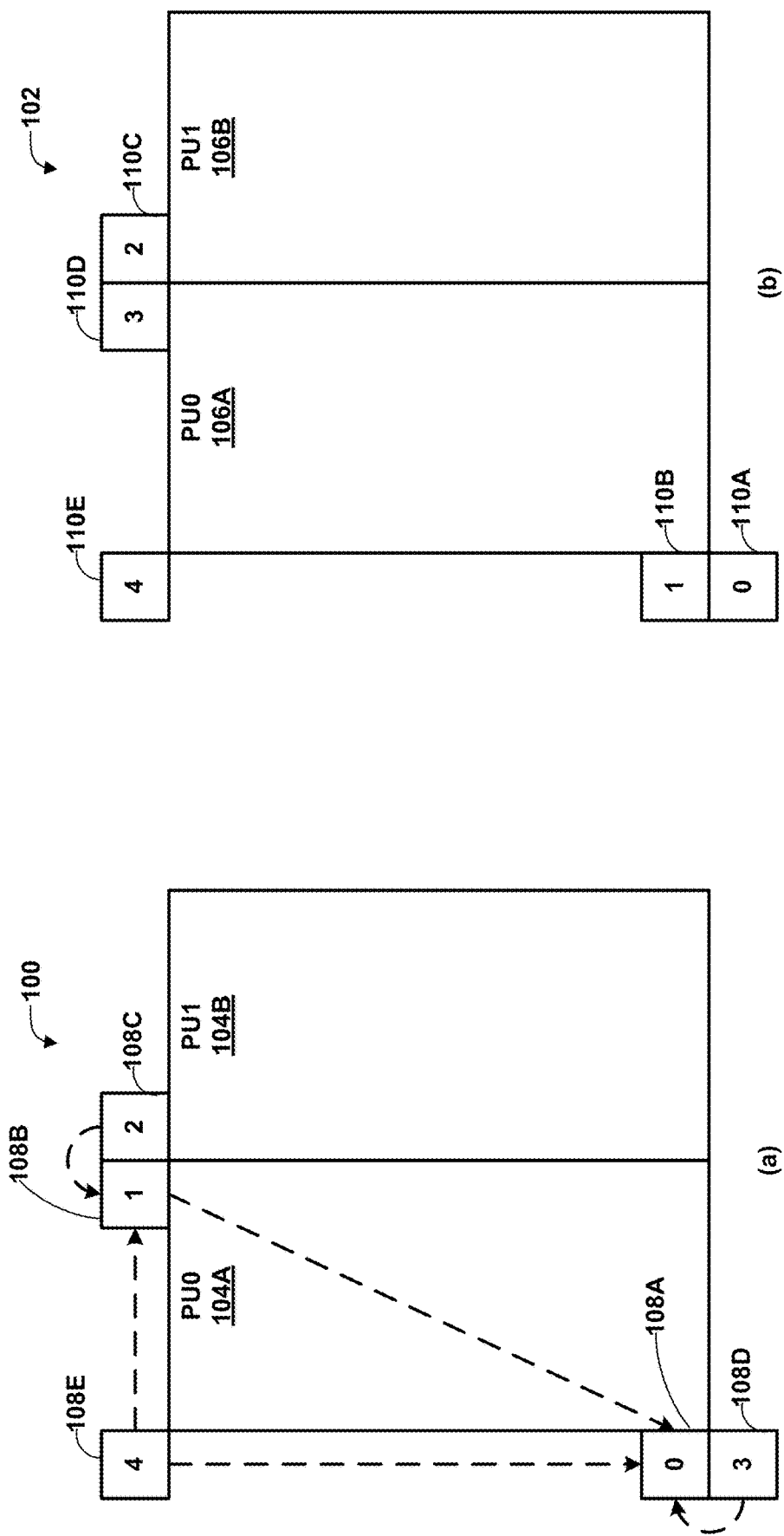
FIG. 4 is a conceptual diagram illustrating spatial neighboring candidates in High Efficiency Video Coding (HEVC).

FIG. 4 is a conceptual diagram illustrating spatial neighboring candidates in HEVC. Spatial MV candidates are derived from the neighboring blocks shown on FIG. 4, for a specific PU (PU0), although the methods of generating the candidates from the blocks differ for merge and AMVP modes.

In merge mode, up to four spatial MV candidates can be derived with the orders shown in FIG. 4(*a*) with numbers, and the order is the following: left (0, A1), above (1, B1), above-right (2, B0), below-left (3, A0), and above left (4, B2), as shown in FIG. 4 (*a*). That is, in FIG. 4(*a*), block 100 includes PU0 104A and PU1 104B. When a video coder is to code motion information for PU0 104A using merge mode, the video coder adds motion information from spatial neighboring blocks 108A, 108B, 108C, 108D, and 108E to a candidate list, in that order. Blocks 108A, 108B, 108C, 108D, and 108E may also be referred to as, respectively, blocks A1, B1, B0, A0, and B2, as in HEVC.

In AVMP mode, the neighboring blocks are divided into two groups: a left group including blocks 0 and 1, and an above group including blocks 2, 3, and 4 as shown on FIG. 4 (*b*). These blocks are labeled, respectively, as blocks 110A, 110B, 110C, 110D, and 110E in FIG. 4(*b*). In particular, in FIG. 4(*b*), block 102 includes PU0 106A and PU1 106B, and blocks 110A, 110B, 110C, 110D, and 110E represent spatial neighbors to PU0 106A. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate; thus, the temporal distance differences can be compensated.

Figure 5:
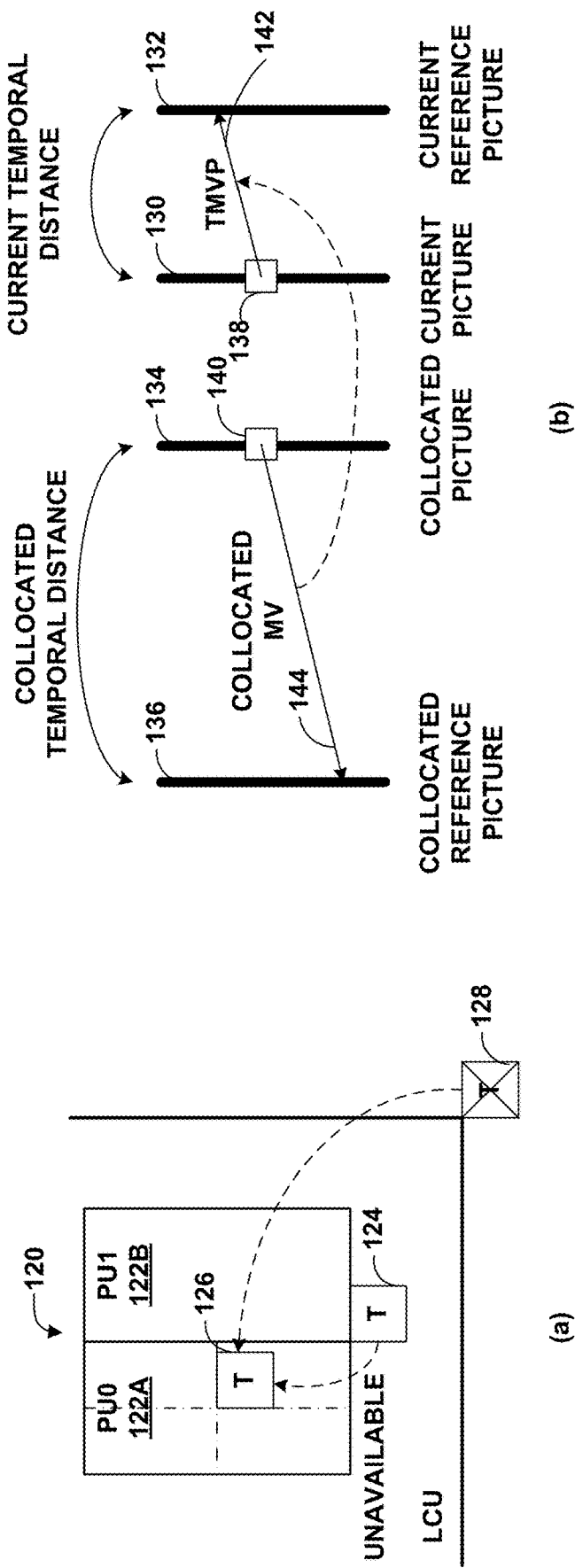
FIG. 5 is a conceptual diagram illustrating temporal motion vector prediction (TMVP) in HEVC.

FIG. 5 is a conceptual diagram illustrating temporal motion vector prediction in HEVC. In particular, FIG. 5(a) illustrates an example CU 120 including PU0 122A and PU 1 122B. PU0 122A includes a center block 126 for PU 122A and a bottom-right block 124 to PU0 122A. FIG. 5(a) also shows an external block 128 for which motion information may be predicted from motion information of PU0 122A, as discussed below. FIG. 5(b) illustrates a current picture 130 including a current block 138 for which motion information is to be predicted. In particular, FIG. 5(b) illustrates a collocated picture 134 to current picture 130 (including collocated block 140 to current block 138), a current reference picture 132, and a collocated reference picture 136. Collocated block 140 is predicted using motion vector 144, which is used as a temporal motion vector predictor (TMVP) 142 for motion information of block 138.

A video coder may add a TMVP candidate (e.g., TMVP candidate 142) into the MV candidate list after any spatial motion vector candidates if TMVP is enabled and the TMVP candidate is available. The process of motion vector derivation for the TMVP candidate is the same for both merge and AMVP modes. However, the target reference index for the TMVP candidate in the merge mode is set to 0, according to HEVC.

The primary block location for the TMVP candidate derivation is the bottom right block outside of the collocated PU, as shown in FIG. 5 (a) as block 124 to PU0 122A, to compensate the bias to the above and left blocks used to generate spatial neighboring candidates. However, if block 124 is located outside of the current CTB row or motion information is not available for block 124, the block is substituted with center block 126 of the PU as shown in FIG. 5(a).

The motion vector for TMVP candidate 142 is derived from co-located block 140 of collocated picture 134, as indicated in slice level information.

Similar to temporal direct mode in AVC, a motion vector of the TMVP candidate may be subject to motion vector scaling, which is performed to compensate picture order count (POC) distance differences between current picture 130 and current reference picture 132, and collocated picture 134 and collocated reference picture 136. That is, motion vector 144 may be scaled to produce TMVP candidate 142, based on these POC differences.

Several aspects of merge and AMVP modes of HEVC are discussed below.

Motion vector scaling: It is assumed that the value of a motion vector is proportional to the distance between pictures in presentation time. A motion vector associates two pictures: the reference picture and the picture containing the motion vector (namely the containing picture). When a motion vector is used by video encoder 20 or video decoder 30 to predict another motion vector, the distance between the containing picture and the reference picture is calculated based on Picture Order Count (POC) values.

For a motion vector to be predicted, its associated containing picture and reference picture are different. That is, there are two POC difference values for two distinct motion vectors: a first motion vector to be predicted, and a second motion vector used to predict the first motion vector. Moreover, the first POC difference is the difference between the current picture and the reference picture of the first motion vector, and the second POC difference is the difference between the picture containing the second motion vector and the reference picture to which the second motion vector refers. The second motion vector may be scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Artificial motion vector candidate generation: If a motion vector candidate list is not complete, artificial motion vector candidates may be generated and inserted at the end of the list until the list includes a predetermined number of candidates.

In merge mode, there are two types of artificial MV candidates: combined candidates derived only for B-slices and zero candidates used only for AMVP if the first type does not provide enough artificial candidates.

For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

The following is a description of an example pruning process for candidate insertion. Candidates from different blocks may happen to be the same, which decreases the efficiency of a merge/AMVP candidate list. A pruning process may be applied to solve this problem. According to the pruning process, a video coder compares one candidate to the others in the current candidate list to avoid inserting an identical candidate, to a certain extent. To reduce the complexity, only limited numbers of pruning processes are applied, instead of comparing each potential candidate with all other existing candidates already in the list.

Figure 6:
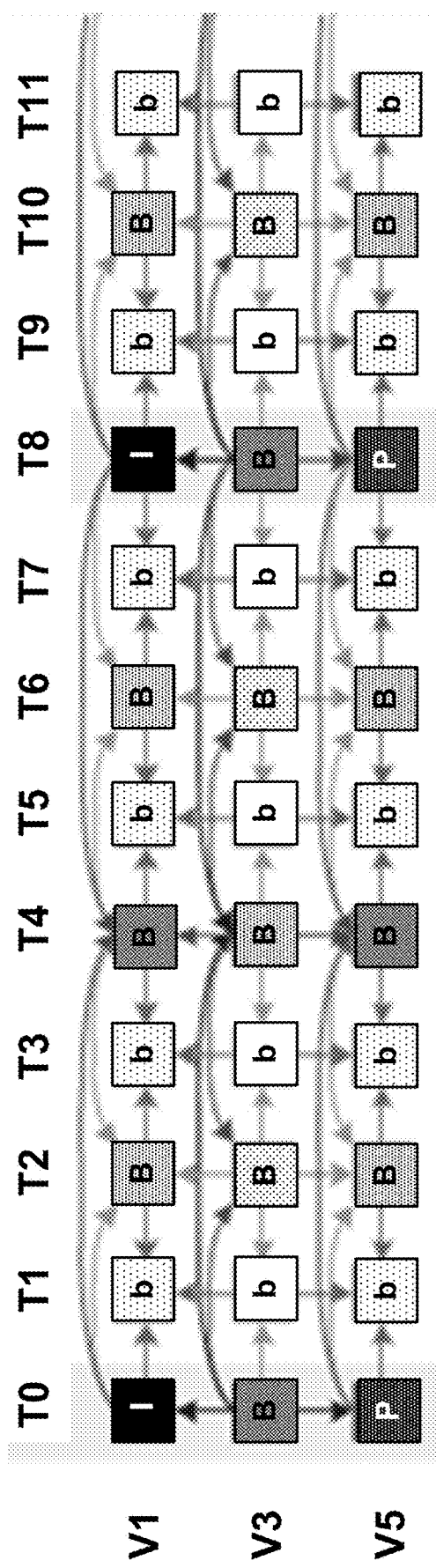
FIG. 6 illustrates an example prediction structure for 3D-HEVC.

FIG. 6 illustrates an example prediction structure for 3D-HEVC. 3D-HEVC is the 3D video extension of HEVC under development by JCT-3V. The key techniques related to the techniques of this disclosure are described in this sub-section.

FIG. 6 shows a multiview prediction structure for a three-view case. V3 denotes the base view and a picture in a non-base view (V1 or V5) can be predicted from pictures in a dependent (base) view of the same time instance.

Figure 8:
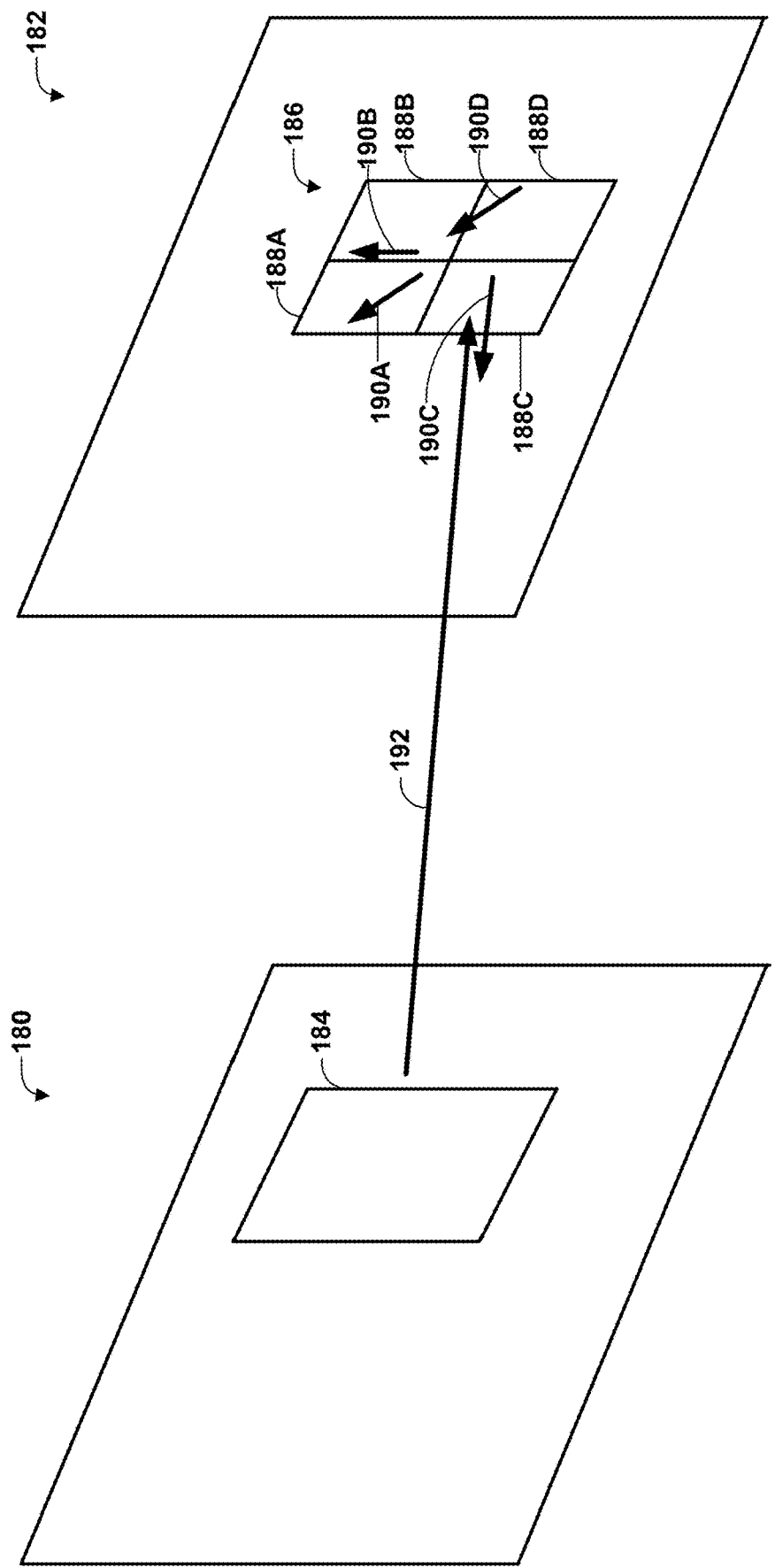
FIG. 8 is a conceptual diagram illustrating sub-PU motion prediction from a reference picture.

It is worth mentioning that the inter-view sample prediction (from reconstructed samples) is supported in MV-HEVC, a typical prediction structure of which is shown in FIG. 8.

Both MV-HEVC and 3D-HEVC are compatible with HEVC in a way that the base (texture) view is decodable by an HEVC (version 1) decoder. A test model for MV-HEVC and 3D-HEVC is described in Zhang et al., "Test Model 6 of 3D-HEVC and MV-HEVC," JCT-3V document ISO/IEC JTC1/SC29/WG11 N13940, available at mpeg.chiariglione.org/standards/mpeg-h/high-efficiency-video-coding/test-model-6-3d-hevc-and-mv-hevc as of Jan. 26, 2015.

In MV-HEVC, a current picture in a non-base view may be predicted by both pictures in the same view and pictures in a reference view of the same time instance, by putting all of these pictures in reference picture lists of the picture. Therefore, a reference picture list of the current picture contains both temporal reference pictures and inter-view reference pictures.

A motion vector associated with a reference index corresponding to a temporal reference picture is denoted as a temporal motion vector.

A motion vector associated with a reference index corresponding to a inter-view reference picture is denoted as a disparity motion vector.

3D-HEVC supports all features in MV-HEVC; therefore, the inter-view sample prediction as mentioned above is enabled.

In addition more advanced texture only coding tools and depth related/dependent coding tools are supported.

The texture only coding tools often requires the identification of the corresponding blocks (between views) that may belong to the same object. Therefore disparity vector derivation is a basic technology in 3D-HEVC.

Figure 7:
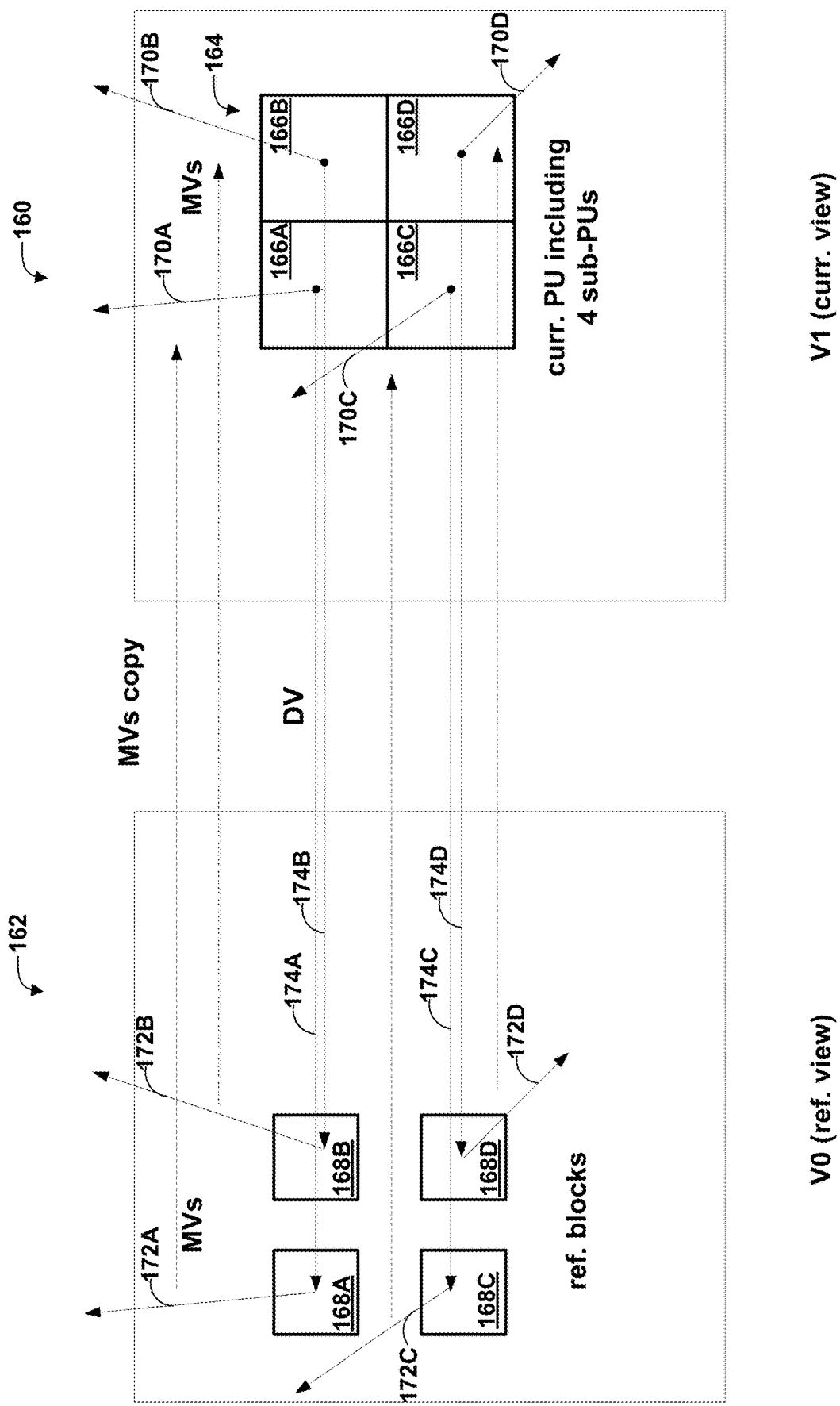
FIG. 7 is a conceptual diagram illustrating sub-PU based inter-view motion prediction in 3D-HEVC.

FIG. 7 is a conceptual diagram illustrating sub-PU based inter-view motion prediction in 3D-HEVC. FIG. 7 shows current picture 160 of a current view (V1) and a collocated picture 162 in a reference view (V0). Current picture 160 includes a current PU 164 including four sub-Pus 166A-166D (sub-PUs 166). Respective disparity vectors 174A-174D (disparity vectors 174) identify corresponding sub-PUs 168A-168D to sub-PUs 166 in collocated picture 162. 3D-HEVC describes a sub-PU level inter-view motion prediction method for the inter-view merge candidate, i.e., the candidate derived from a reference block in the reference view.

When such a mode is enabled, current PU 164 may correspond to a reference area (with the same size as the current PU identified by the disparity vector) in the reference view and the reference area may have richer motion information than needed for generation of one set of motion information typically for a PU. Therefore, a sub-PU level inter-view motion prediction (SPIVMP) method may be used, as shown in FIG. 7.

This mode may also be signaled as a special merge candidate. Each of the sub-PUs contains a full set of motion information. Therefore, a PU may contain multiple sets of motion information.

Sub-PU based motion parameter inheritance (MPI) in 3D-HEVC: Similarly, in 3D-HEVC, the MPI candidate can also be extended in a way similar to sub-PU level inter-view motion prediction. For example, if the current depth PU has a co-located region which contains multiple PUs, the current depth PU may be separated into sub-PUs, and each PU may have a different set of motion information. This method is called sub-PU MPI. That is, motion vectors 172A-172D of corresponding sub-PUs 168A-168D may be inherited by sub-PUs 166A-166D, as motion vectors 170A-170D, as shown in FIG. 7.

Sub-PU related information for 2D video coding: In U.S. application Ser. No. 14/497,128, filed Sep. 25, 2014, published as U.S. Publication No. 2015/0086929 on Mar. 26, 2015, a sub-PU based advanced TMVP design is described. In single-layer coding, a two-stage advanced temporal motion vector prediction design is proposed.

A first stage is to derive a vector identifying the corresponding block of the current prediction unit (PU) in a reference picture, and a second stage is to extract multiple sets motion information from the corresponding block and assign them to sub-PUs of the PU. Each sub-PU of the PU therefore is motion compensated separately. The concept of the ATMVP is summarized as follows:
1. The vector in the first stage can be derived from spatial and temporal neighboring blocks of the current PU.
2. This process may be achieved as activating a merge candidate among all the other merge candidates.

Applicable to single-layer coding and sub-PU temporal motion vector prediction, a PU or CU may have motion refinement data to be conveyed on top of the predictors.

Several design aspects of the Ser. No. 14/497,128 application are noted as follows:
1. The first stage of vector derivation can also be simplified by just a zero vector.
2. The first stage of vector derivation may include identifying jointly the motion vector and its associated picture. Various ways of selecting the associated picture, and further deciding the motion vector to be the first stage vector, have been proposed.
3. If the motion information during the above process is unavailable, the "first stage vector" is used for substitution.
4. A motion vector identified from a temporal neighbor has to be scaled to be used for the current sub-PU, in a way similar to motion vector scaling in TMVP. However, which reference picture such a motion vector may be scaled to can be designed with one of the following ways:
   a. The picture is identified by a fixed reference index of the current picture.
   b. The picture is identified to be the reference picture of the corresponding temporal neighbor, if also available in a reference picture list of the current picture.
   c. The picture is set to be the collocated picture identified in the first stage and from where the motion vectors are retrieved.

FIG. 8 is a conceptual diagram illustrating sub-PU motion prediction from a reference picture. In this example, current picture 180 includes a current PU 184 (e.g., a PU). In this example, motion vector 192 identifies PU 186 of reference picture 182 relative to PU 184. PU 186 is partitioned into sub-PUs 188A-188D, each having respective motion vectors 190A-190D. Thus, although current PU 184 is not actually partitioned into separate sub-PUs, in this example, current PU 184 may be predicted using motion information from sub-PUs 188A-188D. In particular, a video coder may code sub-PUs of current PU 184 using respective motion vectors 190A-190D. However, the video coder need not code syntax elements indicating that current PU 184 is split into sub-PUs. In this manner, current PU 184 may be effectively predicted using multiple motion vectors 190A-190D, inherited from respective sub-PUs 188A-188D, without the signaling overhead of syntax elements used to split current PU 184 into multiple sub-PUs.

FIG. 9 is a conceptual diagram illustrating relevant pictures in ATMVP (similar to TMVP). In particular, FIG. 9 illustrates current picture 204, motion source picture 206, and reference pictures 200, 202. More particularly, current picture 204 includes current block 208. Temporal motion vector 212 identifies corresponding block 210 of motion source picture 206 relative to current block 208. Corresponding block 210, in turn, includes motion vector 214, which refers to reference picture 202 and acts as an advanced temporal motion vector predictor for at least a portion of current block 208, e.g., a sub-PU of current block 208. That is, motion vector 214 may be added as a candidate motion vector predictor for current block 208. If selected, at least a portion of current block 208 may be predicted using a corresponding motion vector, namely, motion vector 216, which refers to reference picture 200.

FIG. 10 is a flowchart illustrating an example method for deriving motion vectors for a given block from spatial and temporal neighboring blocks of the given block. The method of FIG. 10 may be performed by video encoder 20 and/or video decoder 30. For generality, the method of FIG. 10 is explained as being performed by a "video coder," which again, may correspond to either of video encoder 20 or video decoder 30.

Initially, a video coder obtains an available motion field from spatial or temporal neighboring blocks for a current sub-PU of a PU (230). The video coder then derives motion information from the obtained neighboring motion field (232). The video coder then determines whether motion information for all sub-PUs of the PU has been derived (234). If not ("NO" branch of 234), the video coder derives motion information for a remaining sub-PU (230). On the other hand, if motion information for all sub-PUs has been derived ("YES" branch of 234), the video coder determines availability of a spatial-temporal sub-PU motion predictor (236), e.g., as explained above. The video coder inserts the spatial-temporal sub-PU motion predictor into a merge list, if the spatial-temporal sub-PU motion predictor is available (238).

Although not shown in the method of FIG. 10, the video coder may then code the PU (e.g., each of the sub-PUs of the PU) using the merge candidate list. For instance, when performed by video encoder 20, video encoder 20 may calculate residual block(s) for the PU (e.g., for each sub-PU) using the sub-PUs as predictors, transform and quantize the residual block(s), and entropy encode the resulting quantized transform coefficients. Video decoder 30, similarly, may entropy decode received data to reproduce quantized transform coefficients, inverse quantize and inverse transform these coefficients to reproduce the residual block(s), and then combine the residual block(s) with the corresponding sub-PUs to decode a block corresponding to the PU.

FIGS. 11A and 11B are conceptual diagrams illustrating examples of blocks including sub-blocks that are predicted using derived motion information. In particular, FIG. 11A illustrates block 250 (e.g., a PU) including sub-blocks 254A-254P (sub-blocks 254), which may represent sub-PUs when block 250 is a PU. Neighboring sub-blocks 256A-256I (neighboring sub-blocks 256) to block 250 are also shown in FIG. 11A and shaded light grey.

In general, a video coder, such as video encoder 20 or video decoder 30, may derive motion information for sub-blocks 254 of block 250 using motion information from two or more neighboring blocks. The neighboring blocks may include spatially neighboring and/or temporally neighboring blocks. For example, a video coder may derive motion information for sub-block 254J from spatially neighboring sub-blocks 254F and 254I, and from a temporally neighboring block corresponding to the position of sub-block 254O. The temporally neighboring block may be from a previously coded picture that is co-located with sub-block 254O. To derive a motion vector of the motion information for sub-block 254J, the video coder may average motion vectors for sub-block 254F, sub-block 254I, and the temporally neighboring block that is co-located with sub-block 254O. Alternatively, the video coder may derive the motion vector using one of equations (1)-(4) as discussed above.

In some examples, the video coder may be configured to always derive motion information from sub-blocks outside of block 250, e.g., neighboring sub-blocks 256 and/or temporally neighboring sub-blocks. Such a configuration may allow sub-blocks 254 to be coded in parallel. For example, the video coder may derive motion information for sub-block 254A from motion information of sub-blocks 256B and 256F, and a temporally neighboring sub-block that is co-located with sub-block 254F. The video coder may also derive motion information for sub-block 254B in parallel with sub-block 254A, using motion information of sub-blocks 256C, 256B, 256F, and temporally neighboring sub-blocks that are co-located with sub-blocks 254F and 254G.

FIG. 11B illustrates block 260 (e.g., a PU) including sub-blocks 264A-264D (sub-blocks 264), which again may represent sub-PUs. FIG. 11B also illustrates neighboring sub-blocks 266A-266I (neighboring sub-blocks 266). In general, the example of FIG. 11B indicates that sub-blocks of a block, such as block 260, may be of a variety of sizes, and may be larger than neighboring blocks used to derive motion information. In this example, sub-blocks 264 are larger than neighboring sub-blocks 266. Nevertheless, video coders (such as video encoder 20 and video decoder 30) may be configured to apply similar techniques to sub-blocks 264 as those discussed above with respect to sub-blocks 254.

Figure 12:
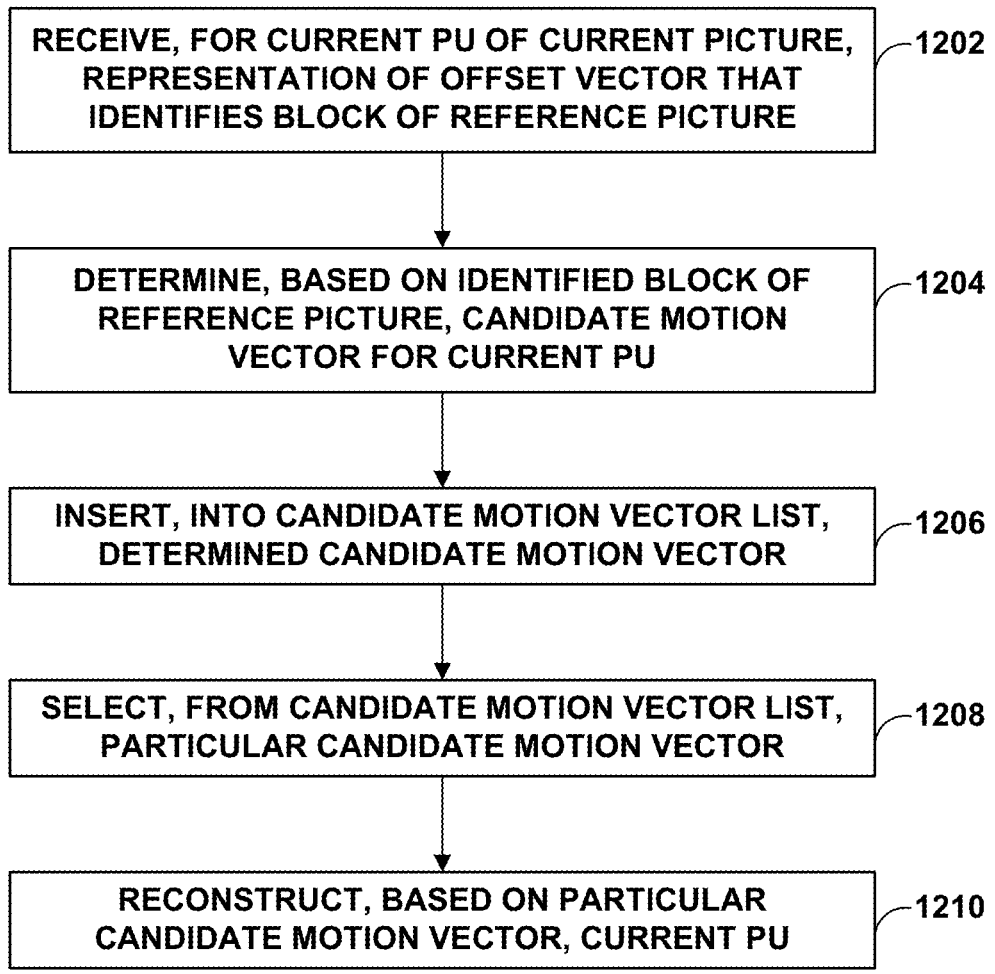
FIG. 12 is a flowchart illustrating an example process for deriving motion information for a current block based on motion information of another block indicated by an offset vector, in accordance with one or more techniques of this disclosure.

FIG. 12 is a flowchart illustrating an example process for deriving motion information for a current block based on motion information of another block indicated by an offset vector, in accordance with one or more techniques of this disclosure. For purposes of explanation, the method of FIG. 12 is described below as being performed by video decoder 30 and the components thereof (e.g., illustrated in FIGS. 1 and 3), though the method of FIG. 12 may be performed by other video decoders.

Video decoder 30 may receive, for a current prediction unit (PU) of a current picture of video data, a representation of an offset vector that identifies a block of a reference picture (1202). For instance, entropy decoding unit 70 of video decoder 30 may receive, from an encoded video bitstream, a truncated unary or truncated Golomb codeword (e.g., a syntax element value) that represents a value of the offset vector. In some examples, the value offset vector may be within a range of values. For instance, the codeword may indicate which value in the range of values is the value of the offset vector. In some examples, the current picture may be a different picture than the reference picture and/or may be from the same view/layer (to the extent the video data has different views or layers) as the reference picture.

In some examples, the values in the range of values may be uniformly distributed. For instance, entropy decoding unit 70 may decode the values of components of the offset vector in the range of x,y∈{−6, −4, −2, 0, 2, 4, 6}. In some examples, the values in the range of values may not be uniformly distributed. For instance, entropy decoding unit 70 may decode the values of components of the offset vector in the range of x,y∈{−8, −4, −2, 0, 2, 4, 8}. As discussed above, by using non-uniform distributions, the amount of data used to represent residual data for the current block may be reduced.

In some examples, different offset vectors may be selected from different ranges of values. As discussed above, in some examples, video decoder 30 may select the range to use based on POC difference between the current picture and the co-located picture, offset predictor, amplitude of offset, or specified in high level syntax.

Video decoder 30 may determine based on the identified block of the reference picture, a candidate motion vector for the current PU (1204). For instance, motion compensation unit 72 may obtain motion information for the identified block of the reference picture. In some examples, video decoder 30 may receive a syntax element (e.g., for the current PU) that identifies the reference picture (e.g., by POC). In some examples, video decoder 30 may derive the identify the reference picture from existing merge candidate or motion information of neighboring blocks (e.g., which are not used in merge candidate derivation process).

Video decoder 30 may insert, in to a candidate motion vector list, the determined candidate motion vector (1206).

For instance, motion compensation unit 72 may insert the determined candidate motion vector in a motion vector candidate list along with other candidate motion vectors (e.g., spatial or temporal candidate motion vectors).

Video decoder 30 may select, from the candidate motion vector list, a particular candidate motion vector (1208). For instance, motion compensation unit 72 may select the candidate motion vector determined based on the motion information of the identified block in the reference picture. In some examples, motion compensation unit 72 may select the particular candidate motion vector based on a syntax element received in the bitstream (e.g., merge_idx, mvp_10_flag, etc.).

Video decoder 30 may reconstruct, based on the selected particular candidate motion vector, the current PU (1210). For instance, motion compensation unit 72 may obtain pixel values for a block of video data identified by the selected particular candidate motion vector (e.g., from reference picture memory 82), and add residual data for a block of video data corresponding to the current PU (e.g., an array of pixels included in the current PU) to the obtained pixel values to reconstruct pixel values of the block of video data corresponding to current PU.

Figure 13:
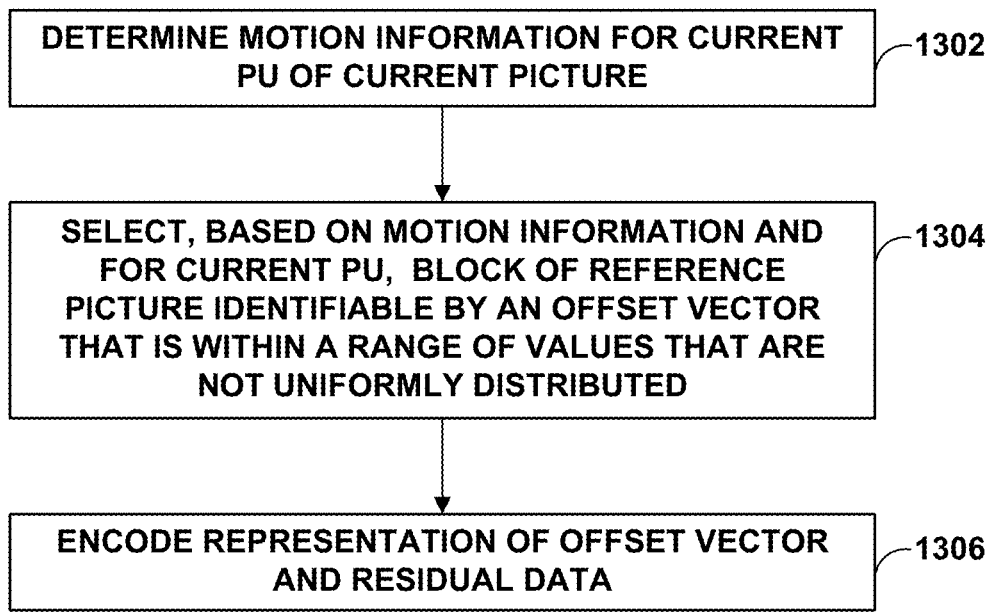
FIG. 13 is a flowchart illustrating an example process for deriving motion information for a current block based on motion information of another block indicated by an offset vector, in accordance with one or more techniques of this disclosure.

FIG. 13 is a flowchart illustrating an example process for deriving motion information for a current block based on motion information of another block indicated by an offset vector, in accordance with one or more techniques of this disclosure. For purposes of explanation, the method of FIG. 13 is described below as being performed by video encoder 20 and the components thereof (e.g., illustrated in FIGS. 1 and 2), though the method of FIG. 13 may be performed by other video encoders.

Video encoder 20 may determine motion information for a current prediction unit (PU) of a current picture of video data (1302). For instance, motion estimation unit 42 and/or motion compensation unit 44 of video encoder 20 may select a predictor block from a reference picture having pixel values similar to pixel values of the current PU and determine the motion information as a reference picture indicator (e.g., a POC value of the reference picture and/or an index in a reference picture list that corresponds to the reference picture) and motion vector that indicates a displacement between the current PU and the predictor block.

Video encoder 20 may select, based on the motion information and for the current PU, a reference block of a reference picture that is identifiable by an offset vector that is within a range of values that are not uniformly distributed (1304). For instance, motion estimation unit 42 and/or motion compensation unit 44 may identify which blocks in various candidate reference pictures may be identified by offset vectors in a non-uniformly distributed range of values and select the block with motion information most similar (or identical to) the motion information determined for the current PU as the selected reference block. It is noted that the reference picture that contains the reference block may or may not be the same picture as the reference picture that contains the predictor block.

Video encoder 20 may encode a representation of the offset vector that indicates the selected reference block and encode residual data that represents pixel differences between the current PU and the predictor block (1306). For instance, motion estimation unit 42 and/or motion compensation unit 44 may cause entropy encoding unit 56 to encode one or more syntax elements that represent the values of the residual data (e.g., quantized transform coefficients, as explained above) and the value of the offset vector. In some examples, the representation of the offset vector may be the values of the horizontal and vertical components of the offset vector. In some examples, the representation of the offset vector may be indices that correspond to the values of the horizontal and vertical components of the offset vector in the range of values. As discussed above, the range of values for the current block may be determined based on a picture order count (POC) difference between the current picture and the reference picture.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
  receiving, in a coded video bitstream and for a current prediction unit (PU) of a current picture of video data, a representation of an offset vector that represents a horizontal and a vertical displacement between the current PU and a block of a reference picture, wherein the offset vector displacements are within a set of values that are not uniformly distributed, and wherein the set of values is $\{-8, -4, -2, 0, 2, 4, 8\}$;
  determining, based on the block of the reference picture identified by the offset vector, motion information for the current PU; and
  reconstructing a block of the current picture corresponding to the current PU based on the determined motion information.

2. The method of claim 1, further comprising:
  partitioning the PU into two or more sub-PUs;
  determining, based on the block of the reference picture identified by the offset vector, respective motion information for each respective sub-PU of the sub-PUs; and
  reconstructing blocks of the current picture respectively corresponding to each of the sub-PUs separately based on the motion information for each of the sub-PUs.

3. The method of claim 1, further comprising:
  receiving, in the coded video bitstream, an identification of the reference picture.

4. The method of claim 1, further comprising:
  determining, based on one or more existing merge candidates or motion information of one or more neighboring blocks of the current PU, an identification of the reference picture.

5. The method of claim 1, wherein the received representation of the offset vector comprises a difference between a value of the offset vector and a value of an offset vector predictor for the current PU.

6. The method of claim 5, further comprising:
  determining, based on one or more spatial or temporal neighbors of the current PU, one or more offset vector predictors; and
  determining the offset vector predictor for the current PU based on the one or more offset vector predictor.

7. The method of claim 1, wherein values in the set of values are in units that are based on a smallest block size in the reference picture for which a motion vector may be stored, and wherein a distance between a value in the set of values and a next largest value in the set of values is greater than one unit.

8. The method of claim 1, further comprising:
  selecting, based on a picture order count (POC) difference between the current picture and the reference picture, the set of values from a plurality of sets of values.

9. A device for decoding video data, the device comprising:
  a memory configured to store video data; and
  one or more processors implemented in circuitry and configured to:
    receive, in a coded video bitstream and for a current prediction unit (PU) of a current picture of the video data, a representation of an offset vector that represents a horizontal and a vertical displacement between the current PU and a block of a reference picture, wherein the offset vector displacements are within a set of values that are not uniformly distributed, and wherein the set of values is $\{-8, -4, -2, 0, 2, 4, 8\}$;
    determine, based on the block of the reference picture identified by the offset vector, motion information for the current PU; and
    reconstruct a block of the video data corresponding to the current PU based on the determined motion information.

10. The device of claim 9, wherein the one or more processors are further configured to:
  partition the PU into two or more sub-PUs;
  determine, based on the block of the reference picture identified by the offset vector, respective motion information for each respective sub-PU of the sub-PUs; and
  reconstruct blocks of the current picture respectively corresponding to each of the sub-PUs separately based on the motion information for each of the sub-PUs.

11. The device of claim 9, wherein the one or more processors are further configured to:
  receive, in the coded video bitstream, an identification of the reference picture.

12. The device of claim 9, wherein the one or more processors are further configured to:
  determine, based on one or more existing merge candidates or motion information of one or more neighboring blocks of the current PU, an identification of the reference picture.

13. The device of claim 9, wherein the received representation of the offset vector comprises a difference between a value of the offset vector and a value of an offset vector predictor for the current PU.

14. The device of claim 13, wherein the one or more processors are further configured to:
  determine, based on one or more spatial or temporal neighbors of the current PU, one or more offset vector predictors; and
  determine the offset vector predictor for the current PU based on the one or more offset vector predictors.

15. The device of claim 9, wherein values in the set of values are in units that are based on a smallest block size in the reference picture for which a motion vector may be stored, and wherein a distance between a value in the set of values and a next largest value in the set of values is greater than one unit.

16. The device of claim 9, wherein the one or more processors are further configured to:
    select, based on a picture order count (POC) difference between the current picture and the reference picture, the set of values from a plurality of sets of values.

17. The device of claim 9, wherein the device is a wireless communication device, further comprising:
    a receiver configured to receive the coded video bitstream; and
    a display configured to display video data including the reconstructed block of video data.

18. The device of claim 17, wherein the wireless communication device is a cellular telephone and the coded video bitstream is received by the receiver and modulated according to a cellular communication standard.

19. A non-transitory computer-readable storage medium storing instructions that, when executed, cause one or more processors of a video decoder to:
    receive, in a coded video bitstream and for a current prediction unit (PU) of a current picture of video data, a representation of an offset vector that represents a horizontal and a vertical displacement between the current PU and a block of a reference picture, wherein the offset vector displacements are within a set of values that are not uniformly distributed, and wherein the set of values is $\{-8, -4, -2, 0, 2, 4, 8\}$;
    determine, based on the block of the reference picture identified by the offset vector, motion information for the current PU; and
    reconstruct a block of the video data corresponding to the current PU based on the determined motion information.

* * * * *